United States Patent
Grunnet-Jepsen et al.

(10) Patent No.: US 12,298,719 B2
(45) Date of Patent: May 13, 2025

(54) METHODS AND APPARATUS TO CALIBRATE SPATIAL LIGHT MODULATORS

(71) Applicant: Intel Corporation, Santa Clara, CA (US)

(72) Inventors: Anders Grunnet-Jepsen, San Jose, CA (US); Paul Winer, Richmond, CA (US); Alexey Supikov, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 793 days.

(21) Appl. No.: 17/359,151

(22) Filed: Jun. 25, 2021

(65) Prior Publication Data

US 2021/0325828 A1    Oct. 21, 2021

(51) Int. Cl.
*G01M 11/02*    (2006.01)
*G01J 9/00*    (2006.01)
(Continued)

(52) U.S. Cl.
CPC .............. *G03H 1/2294* (2013.01); *G01J 9/00* (2013.01); *G01J 9/02* (2013.01); *G01M 11/02* (2013.01);
(Continued)

(58) Field of Classification Search
CPC .. G03H 1/0406; G03H 1/0005; G03H 1/0443; G03H 1/0465; G03H 1/2294;
(Continued)

(56) References Cited

U.S. PATENT DOCUMENTS

2004/0101168 A1* 5/2004 Kostrzewski ........ G06K 19/086
 708/816
2004/0125380 A1   7/2004 Pepper
(Continued)

FOREIGN PATENT DOCUMENTS

GB    2477844 A    8/2011

OTHER PUBLICATIONS

European Patent Office, "Extended European Search Report," issued in connection with European Application No. 22164155.8, issued on Sep. 23, 2022, 8 pages.
(Continued)

*Primary Examiner* — Isiaka O Akanbi
(74) *Attorney, Agent, or Firm* — Hanley, Flight & Zimmerman, LLC

(57) ABSTRACT

Methods and apparatus to calibrate spatial light modulators are disclosed. Examples include processor circuitry to execute and/or instantiate instructions to provide a greyscale image to a spatial light modulator (SLM) to define voltages to be applied to individual pixels of the SLM. The voltages associated with pixel values in the greyscale image. The pixel values arranged in a double-slit grating pattern. The SLM to produce an interference pattern based on the double-slit grating pattern. The processor circuitry is to determine a phase difference between first and second gratings of the double-slit grating pattern based on the interference pattern. The processor circuitry is to generate a phase curvature based on the phase difference.

25 Claims, 13 Drawing Sheets

(51) Int. Cl.

| | |
|---|---|
| *G01J 9/02* | (2006.01) |
| *G03H 1/02* | (2006.01) |
| *G03H 1/08* | (2006.01) |
| *G03H 1/22* | (2006.01) |
| *G09G 3/34* | (2006.01) |
| *H04N 9/31* | (2006.01) |
| *H04N 13/327* | (2018.01) |

(52) U.S. Cl.
CPC ........ *G01M 11/0271* (2013.01); *G03H 1/024* (2013.01); *G03H 1/0866* (2013.01); *G09G 3/3466* (2013.01); *H04N 9/3179* (2013.01); *H04N 9/3191* (2013.01); *H04N 13/327* (2018.05); *G03H 2222/12* (2013.01); *G03H 2225/23* (2013.01); *G03H 2225/32* (2013.01); *G03H 2226/02* (2013.01)

(58) Field of Classification Search
CPC ... G03H 2001/0447; G03H 2001/0471; G03H 2222/16; G03H 2223/16; G03H 1/024; G03H 1/0866; G03H 2222/12; G03H 2225/23; G03H 2225/32; G03H 2226/02; G03H 2001/0033; G02B 7/04; G02B 26/06; G02B 26/106; G02B 26/128; G02B 5/32; G02B 27/0944; G02B 27/0955; G02B 27/4205; G01J 9/00; G01J 9/02; G01M 11/02; G01M 11/0271; G09G 3/3466; H04N 9/3179; H04N 9/3191; H04N 13/327
USPC .............................. 356/445–446, 458; 359/9
See application file for complete search history.

(56) References Cited

U.S. PATENT DOCUMENTS

| | | | |
|---|---|---|---|
| 2005/0030603 A1* | 2/2005 | Takemori | G03H 1/02 359/22 |
| 2007/0024999 A1* | 2/2007 | Crossland | G03H 1/2645 359/366 |
| 2018/0070891 A1* | 3/2018 | Jepsen | A61B 5/7264 |
| 2019/0072897 A1* | 3/2019 | Jepsen | G02B 26/128 |
| 2019/0212544 A1* | 7/2019 | Heber | G02F 1/1333 |
| 2019/0369411 A1* | 12/2019 | Piestun | G02B 27/4205 |
| 2020/0383646 A1* | 12/2020 | Jepsen | G03H 1/0443 |
| 2023/0043791 A1* | 2/2023 | Supikov | G03H 1/0866 |

OTHER PUBLICATIONS

Jesacher et al., "Wavefront correction of spatial light modulators using an optical vortex image," Optics Express, vol. 15, No. 9, Apr. 30, 2007, pp. 5801-5808.
Marco et al., "Measuring the spatial deformation of a liquid-crystal on silicon display with a self-interference effect," Optics Letters, vol. 45, No. 16, Aug. 15, 2020, 5 pages.
Xun et al., "Phase calibration of spatially nonuniform spatial light modulators," Applied Optics, vol. 43, No. 35, Dec. 10, 2004, 7 pages.
Wikipedia, "Double-slit experiment," Retrieved from https://en.wikipedia.org/w/index.php?title=Doubleslit_experiment&oldid=1007137521, Feb. 16, 2021, 17 pages.
Wikipedia, "Gerchberg-Saxton algorithm," Retrieved from https://en.wikipedia.org/w/index.php?title=Gerchberg-Saxton_algorithm&oldid=1006047186, Feb. 10, 2021, 2 pages.
Lumen Physics, "Young's Double Slit Experiment," Retrieved from https://courses.lumenlearning.com/physics/chapter/27-3-youngs-double-slit-experiment/, accessed Feb. 25, 2021, 14 pages.
European Patent Office, "Communication pursuant to Article 94(3) EPC," issued in connection with European Patent Application No. 22 164 155.8-1020, dated Mar. 7, 2024, 5 pages.

* cited by examiner

METHODS AND APPARATUS TO CALIBRATE SPATIAL LIGHT MODULATORS

FIELD OF THE DISCLOSURE

This disclosure relates generally to spatial light modulators, and, more particularly, to methods and apparatus to calibrate spatial light modulators.

BACKGROUND

Spatial light modulators (SLMs) are devices that can be controlled or programmed to modulate the intensity and/or phase of a beam of light. SLMs are implemented in many types of optical applications including projectors, automotive heads-up displays, 3D optical printing, augmented and/or virtual reality, optical computing, and holography. In recent years, significant advancements in holography have been made to develop phase-only SLMs capable of projecting volume images into 3D space. While SLM technology continues to advance in the field of holography, imperfections in the design and manufacturing of SLMs and the associated optical systems that provide input light beams to the SLMs result in relatively significant imperfections in the quality of images output by SLMs in practice relative to what is theoretically possible based on simulations.

Figure 1:
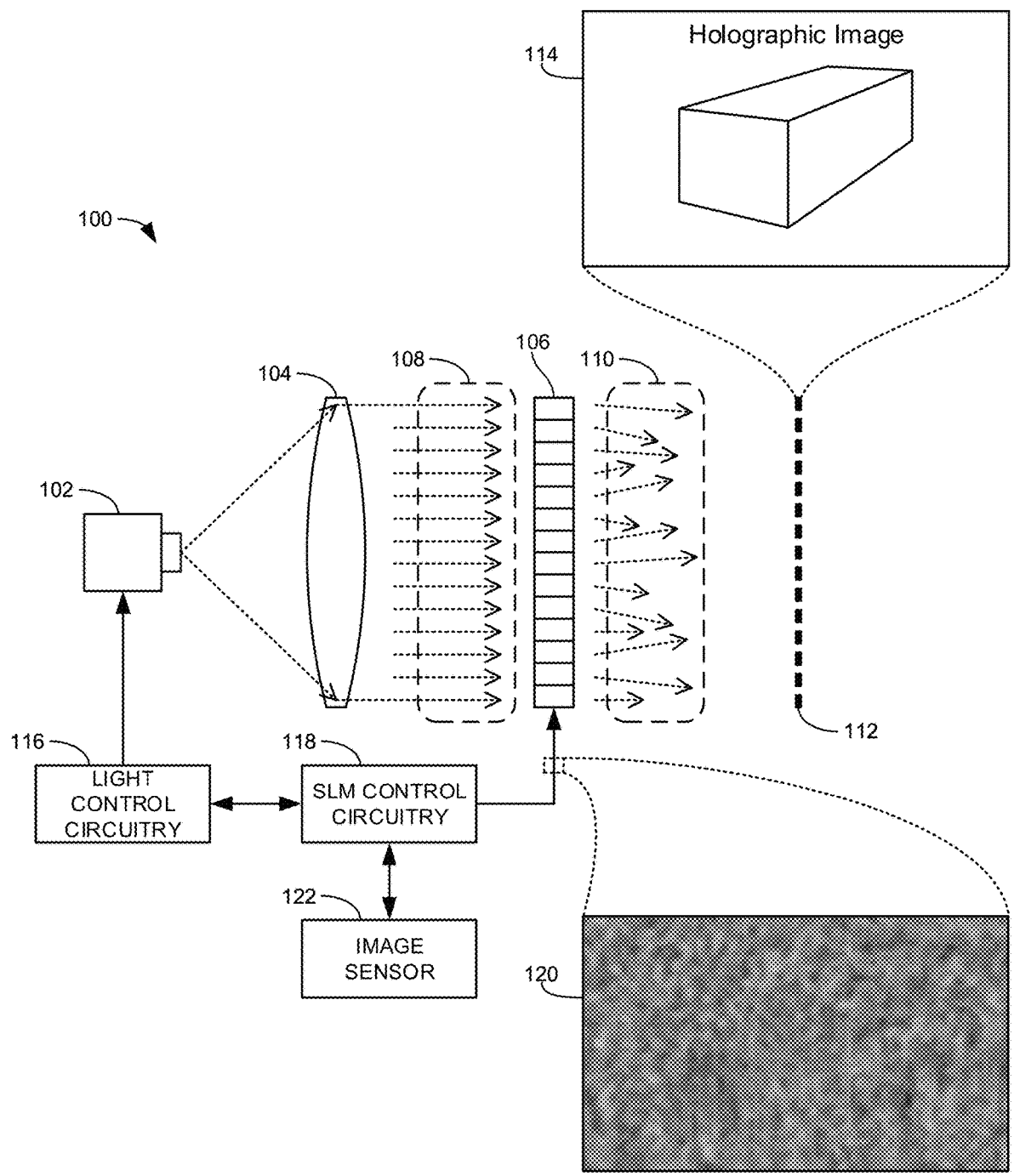
FIG. 1 illustrates an example SLM system constructed in accordance with teachings disclosed herein.

The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute and/or instantiate the computing task(s).

DETAILED DESCRIPTION

The nature of an image produced or output by a spatial light modulator (SLM) is a function of the wavefront of the light beam input to the SLM and how individual pixels of the SLM are controlled to modulate or adjust the light beam. Inasmuch as SLMs are fully programmable, it is theoretically possible for an SLM to produce any desired output image from the same input light beam. However, high quality images (e.g., images with little to no noise and/or graininess, images with relatively high sharpness, images with relatively high contrast, images with relatively high resolution, etc.) depend upon a correct understanding of the wavefront of the input light beam and correctly controlling the individual pixels of the SLM modulate or adjust the input light beam. For instance, in most SLM systems, the input light beam is assumed to be collimated with a consistent amplitude or intensity and a consistent phase across the SLM surface (e.g., the wavefront of the input light beam is assumed to correspond to a uniform plane wave of coherent light). However, there are limitations to the manufacturing and assembly of optical systems (e.g., associated with lens aberrations, lens misalignments, etc.) that produce and collimate light such that it is unlikely that the wavefront of a light beam is truly collimated with a perfectly uniform amplitude and phase in practical applications. Imperfections in the input light beam wavefront from what is assumed (e.g., a perfectly uniform plane wave) can deleteriously affect an image output by an SLM based on such light. Examples disclosed herein enable an accurate measurement or characterization of the input light beam wavefront so that control of the SLM can be compensated for any imperfections in the input beam (e.g., due to aberrations or misalignments in optical lens and the like).

Further, individual pixels of an SLM are controlled to adjust or modulate the input light received at each pixel by a particular amount. More particularly, in phase-only SLMs, applying different voltages to different pixels causes the corresponding pixels to modulate the phase (or time delay) of the light to a different extent. Typically, the voltages for all pixels in the SLM are defined by different pixel values (e.g., ranging from 0 to 255) in a greyscale image. Thus, for example, a minimum voltage (e.g., no voltage defined by a pixel value of 0) applied to a particular pixel causes a phase shift of 0 in the output light beam (e.g., no delay). By contrast, a maximum voltage (e.g., defined by a pixel value of 255) applied to a particular pixel causes a phase shift of $2\pi$ (e.g., a delay of one full wavelength of light). Ideally, each voltage corresponding to each pixel value between the minimum and maximum produces an incremental change in the resulting amount of phase shift. However, in reality, the relationship to voltage level and phase shift is not linear. Furthermore, the non-linear relationship of the voltage-to-phase response for pixels in an SLM is not necessarily consistent across all pixels in the SLM but can differ depending on the X-Y location of the pixels within the SLM. For example, differences in the voltage-to-phase response of particular pixels can arise from the phase retardation and attenuation response of a liquid crystal SLM or the variable physical displacement of a microelectromechanical (MEMs) element. Further still, in some examples, the voltage-to-phase response depends upon the particular wavelength of light being modulated. Unless all of the differences in the voltage-to-phase response of the pixels of an SLM are accounted for, the actual output of an SLM will be degraded relative to an intended output (e.g., image quality will be reduced). Examples disclosed herein enable the accurate measurement of the voltage-to-phase response of the pixels across an SLM so that pixel values (e.g., in a greyscale image) defining voltage values result in an expected phase shift, thereby enabling the precise control of the output wavefront to produce high quality images. The voltage-to-phrase response is sometimes referred to herein simply as the "phase response" for the sake of brevity.

Stated generally, the light exiting an SLM (e.g., the output light beam) can be characterized as having a phase and amplitude in the exit plane as follows:

$$\text{Phase}(x,y,V) = \text{Phase}DC(x,y,V=0) + \text{Phase}AC(x,y,V) \quad \text{Eq.1}$$

$$\text{Amplitude}(x,y,V) = \text{Amplitude}DC(x,y,V=0) + \text{Amplitude}AC(x,y,V) \quad \text{Eq.2}$$

where V is the applied greyscale (e.g., ranging from 0 to 255). The DC terms in the above equations (e.g., PhaseDC and AmplitudeDC) correspond to the input beam to the SLM. As noted above, the input beam typically includes non-ideal imperfections in the uniformity of the intensity and phase of the light across the SLM surface. The AC terms in the above equations (e.g., PhaseAC and AmplitudeAC) correspond to the changes in the input as modulated by the SLM based on the phase response of the individual pixels of the SLM. Examples disclosed herein enable accurate measurement and/or characterization of the input wavefront to an SLM (corresponding to the AC terms in the above equations). Further, examples disclosed herein enable the accurate measurement and/or characterization of the phase response of the SLM (corresponding to the DC terms in the above equations). As a result, examples disclosed herein are able to fully define the output or exit wavefront produced by the SLM. Therefore, the SLM can compensate for errors in the input and can be calibrated to ensure the output image corresponds to the intended image with a relative high degree of accuracy. Examples disclosed herein are described with reference to phase-only SLMs (e.g., SLMs that modulate phase but not intensity). Accordingly, the AmplitudeAC term in Equation 2 may be ignored or omitted. However, teachings disclosed herein may be suitable adapted for implementation in connection with other types of SLMs.

Past approaches to characterize or determine the various terms in Equations 1 and 2 present a number of challenges that result in inaccuracies or other difficulties. One existing approach is to create a linear grating across the SLM (or a portion thereof) by applying alternating high and low phase voltages to corresponding rows of pixels. Such a grating causes incoming light to diffract into +/−higher orders. In principle, the diffraction efficiency should follow a sine-square functional dependence of phase difference on the assumption that the grating is nominally a square-wave phase grating. Accordingly, this existing approach attempts to deduce the phase terms (Equation 1) from the diffraction efficiency of each order versus voltage curve. However, such efforts are complicated by the fact that there are fringe fields between pixels, meaning that the grating is not actually a square wave. As a result, the results of this existing approach, though potentially capable of improving output image quality, are premised on assumptions that inherently result in inaccuracies.

Another existing approach is based on a refinement of the Gerchberg-Saxon algorithm in which the phase of a wavefront is recovered from measurements of multiple different intensity images. For instance, such measurements can be made by impressing Fresnel zone lens structures of differing focus. This approach can result in inaccuracies because the technique is very sensitive to the accurate measurement of the intensity profile.

Furthermore, both of the above existing approaches generally rely on indirect measurements of the phase (e.g., based on intensity and/or diffraction efficiency) that require specific underlying models and/or require solving complex multivariable optimization problems that are hypersensitive to the intensity measurements. As a result, these past approaches are relatively complex and prone to error. Furthermore, these existing approaches require relatively large operating distances making compact implementation problematic and also giving rise to errors due to vibrations and/or air turbulence.

Unlike past approaches, examples disclosed herein determine phase based on a direct measurement of the output of an SLM without the need for complex computations or specific underlying models. Furthermore, examples disclosed herein can be performed in-situ without any significant amount of space or extra components or fixtures to determine all the terms in Equations 1 and 2. Once the terms of Equations 1 and 2 are defined, imperfections in the SLM system (e.g., either imperfections in the optical system generating the input light or inaccuracies in the expected phase responses of the SLM itself) can be compensated for, thereby reducing (e.g., effectively eliminating) the imperfections.

FIG. 1 illustrates an example SLM system 100 constructed in accordance with teachings disclosed herein. In the illustrated example, a light source 102 produces a beam of light that may be expanded and collimated by one or more optical elements 104 (e.g., lens, mirrors, etc.) and directed toward a SLM 106. The SLM 106 includes a two-dimensional array of pixels. The SLM 106 may be constructed with any suitable pixel resolution (e.g., 1920×1080).

As represented in FIG. 1, the light incident on the SLM 106 corresponds to the input wavefront 108 that may be characterized as generally corresponding to a uniform plane wavefront (e.g., coherent, collimated, and with a uniform intensity). However, as mentioned above, the input wavefront 108 will not be perfectly coherent, collimated, or uniform due to imperfections in the optical elements 104 and/or their alignment with the light source 102. The light emanating away from the SLM 106 corresponds to the output wavefront 110 produced by the SLM. In this example, the SLM is transmissive such that the light passes through the SLM with the output wavefront 110 on the opposite side of the SLM 106 from the input wavefront 108. In other examples, the SLM 106 is reflective such that the output wavefront 110 is on the same side of the SLM 106 as the input wavefront 108.

As represented in the illustrated example of FIG. 1, the output wavefront 110 is different than the input wavefront 108 because the light is modified by the SLM 106. More particularly, in this example, the SLM 106 includes individual pixels that cause the incident light to scatter or diffuse. The angle of the arrows in the output wavefront 110 of the illustrated example are not intended to indicate a particular direction for the beam of light but to represent that the light is no longer collimated. Further, in this example, the SLM 106 modifies the light by modulating the phase of the light such that it is no longer coherent. More particularly, the pixels of the SLM 106 modulate the phase of a corresponding portion of the light in accordance with a voltage applied to the pixel. Changing/modulating the phase effectively delays the corresponding portion of the light relative to other portions of the light. In some examples, each pixel can shift the phase of the portion of light it affects up to $2\pi$, thereby causing the light associated with the corresponding pixel to be delayed by a up to a full wavelength of the light. The phase delay or phase shift is represented by the different lengths of the arrows and the locations of the arrowheads in the output wavefront 110 of FIG. 1. In this example, the SLM 106 is a phase-only SLM such that the intensity of the output wavefront 110 is generally consistent with the input wavefront 108. In other examples, the SLM 106 may also modulate the intensity of the light.

Because the phase delay of the light associated with each pixel in the SLM 106 can be controlled, the SLM 106 is able to produce a particular interference pattern of the light at a specified image plane 112 as the wavefront 110 propagates outward. In this example, the particular interference pattern corresponds to a holographic output image 114. The SLM 106 can produce different images by adjusting the voltages applied to the pixels to correspondingly adjust the phase delays of the light so as to produce a different interference pattern corresponding to the intended output image. In some examples, the output image 114 is projected onto a surface positioned at the image plane 112 to render the image 114 visible. Additionally or alternatively, the output image 114 may be viewable from a position beyond the image plane 112 such that the image plane 112 is positioned between the SLM 106 and an intended viewer of the image 114.

As shown in the illustrated example, the light source 102 is controlled by a light control circuitry 116 and the SLM 106 is controlled by a SLM control circuitry 118. In some examples, both the light control circuitry 116 and the SLM control circuitry 118 are implemented by a single control circuit. In some examples, each of the light source 102, the optical elements 104, the SLM 106, the light control circuitry 116, and the SLM control circuitry 118 of the SLM system 100 are incorporated into a single electronic device. In other examples, different ones of the components of the SLM system 100 may be associated with and/or implemented in different devices. For instance, in some examples, the light source 102, the optical elements 104, and the SLM 106 are implemented in a first electronic device and the SLM control circuitry 118 is implemented in a separate standalone device (e.g., a standalone computer).

Regardless of the particular arrangement of components in one or more devices, the SLM control circuitry controls the SLM 106 by causing particular voltages to be applied to corresponding pixels in the SLM 106. In some examples, the particular voltages for the pixels are defined by corresponding pixel values in a greyscale image, such as the example greyscale image 120 shown in FIG. 1. In this example, a pixel value of 0 corresponds to a black pixel in the greyscale image 120 and is intended to cause no phase delay (e.g., a phase shift of 0). Further, a pixel value of 255 corresponds to a white pixel in the greyscale image 120 and is intended to cause a maximum phase delay (e.g., a phase shift of $2\pi$). As can be seen, there is no apparent visual correlation between the greyscale image 120 that defines the voltages applied to the pixels and the resulting output image 114 produced at the image plane 112. This is because the greyscale image 120 merely defines the phase delays of light from individual ones of the light and such phase delays, in turn, produce the interference pattern corresponding to the output image 114.

In the illustrated example of FIG. 1, the SLM control circuitry 118 is in communication with an image sensor 122 (e.g., a camera). In this examples, the image sensor 122 is constructed and oriented to capture the output of the SLM 106. For instance, in some examples, the output of the SLM 106 is projected onto a surface (e.g., a projector screen, a wall, etc.) and the image sensor 122 is positioned to capture the light as projected onto the surface. Additionally or alternatively, in some examples, the image sensor 122 is positioned to directly capture the output light emanating from the SLM 106. In some examples, the image sensor 122 is incorporated into the same electronic device as the rest of the SLM system 100. In other examples, the image sensor 122 is incorporated into the same electronic device as the SLM control circuitry 118, both of which are separate from the rest of the components of the SLM system 100. In other examples, the image sensor 122 is associated with a standalone device that is separate from the SLM control circuitry 118 (which may or may not be incorporated into the same device as the rest of the SLM system 100).

In some examples, as described in further detail below, the SLM control circuitry 118 uses feedback from the image sensor 122 to determine or characterize the input wavefront 108 of the light incident on the SLM 106. Once the input wavefront 108 is characterized (including any imperfections in its collimation, coherency, and/or intensity), the SLM control circuitry 118 adjusts the voltages applies to the pixels of the SLM to compensate for the imperfections. Further, in some examples, as described in further detail below, the SLM control circuitry 118 uses feedback from the image sensor 122 to determine the phase response of the pixels of the SLM input wavefront 108 of the light incident on the SLM 106. More particularly, in some examples, the SLM control circuitry 118 determines phase response curves for different locations of the SLM 106 that define the resulting phase shift for any given applied voltage at the corresponding locations of the pixels of the SLM 106. In some examples, the SLM control circuitry 118 stores these phase response curves in memory (e.g., as values in a lookup table(s)) so that each time a new output image is to be generated, the proper voltage to produce a proper phase shift that gives rise to an intended interference pattern corresponding to the output image can be generated. by utilizing the corresponding values from the curve(s) and/or corresponding lookup table(s).

Examples disclosed herein involve a specific application of Thomas Young's double-slit experiment. Briefly, the double-slit experiment involves shining a coherent beam of light through two parallel slits in an otherwise opaque plate. The slits cause the light to diffract as it propagates past the plate towards a screen. The diffracted light from the two slits interfere with each other to produce an interference pattern of alternating bright (e.g., high intensity) and dark (e.g., low intensity) bands on the screen. The intensity (I) of light of the interference pattern can be expressed mathematically by the Fraunhofer diffraction equation as follows:

$$I(\theta) \propto \cos^2\left[\frac{\pi d \sin\theta}{\lambda}\right] \text{sinc}^2\left[\frac{\pi d \sin\theta}{\lambda}\right] \qquad \text{Eq. 3}$$

where $\theta$ is the angle from a direction normal to the plate containing the slits at a midpoint between slits, d is the distance between the two slits, b is the width of each slit, and $\lambda$ is the wavelength of light. Significantly, the phase of the interference pattern defined by Equation 3 relates directly to the difference in phase of light transmitted through the two slits. Thus, for example, if the first slit included a piece of glass that introduces a $\pi$ phase shift (relative to the second slit), the interference sine pattern produced by the diffracted light would theoretically be shifted by exactly $\pi$ (relative to an interference pattern produced by both slits transmitting light that is perfectly in phase). Thus, measuring the phase shift in an interference pattern produced by two slits corresponds to a direct measurement of the phase difference in light transmitted by the two slits.

Ignoring the apodization, Equation 3 shows that $$I(\theta) \propto \cos^2\left(\frac{2\pi d \sin(\theta)}{\lambda} + \frac{\phi}{2}\right) \qquad \text{Eq. 4}$$

Further, since $\cos^2(A/2)=0.5(\cos(A)+1)$, the final intensity pattern can be expressed as follows:

$$I(\theta) \propto 0.5\left[\cos\left(\frac{2\pi d \sin(\theta)}{\lambda} + \phi\right) + 1\right] \qquad \text{Eq. 5}$$

Equation 5 indicates that the interference intensity pattern for two slits is comparable to a cosine function shifted up to vary from 1 to 0. Thus, the interference pattern will exhibit constructive interference in the middle (e.g., at $\theta$=0), only if $\phi$=0.

As noted above, the phase of an interference pattern produced by two slits is directly proportional to the phase difference between the two slits. Thus, the phase difference between the slits can be directly measured by measuring the phase shift of an interference pattern produced by the slits. This relationship can be used to characterize the wavefront of an input beam of light (e.g., the input wavefront 108 of FIG. 1) to an SLM (e.g., the SLM 106 of FIG. 1) by controlling individual pixels in the SLM in a manner that mimics the double-slit experiment described above. Notably, SLMs do not have actual slits. However, particular voltages applied to particular ones of the pixels can recreate the effect of the double-slit experiment. For SLMs that modulate the intensity of a beam of light, the double-slit experiment can be recreated by setting the voltage applied to pixels corresponding to the slits to produce a high intensity output and setting the voltage applied to the other pixels (not corresponding to the slits) to produce a low intensity of light. For phase-only SLMs, recreating the double-slit experiment is not so straightforward because such SLMs are only capable of modulating the phase of the light. However, a double-slit experiment can be mimicked using a phase-only SLM by setting the voltage applied to the pixels corresponding to the slits according to a diffracting grating pattern. That is, rather than setting the voltages of all pixels corresponding to a particular slit to the same value, the voltages alternate between high and low values along the length of the region in the SLM corresponding to the particular slit. This is illustrated and described in further detail in connection with FIG. 2.

Figure 2:
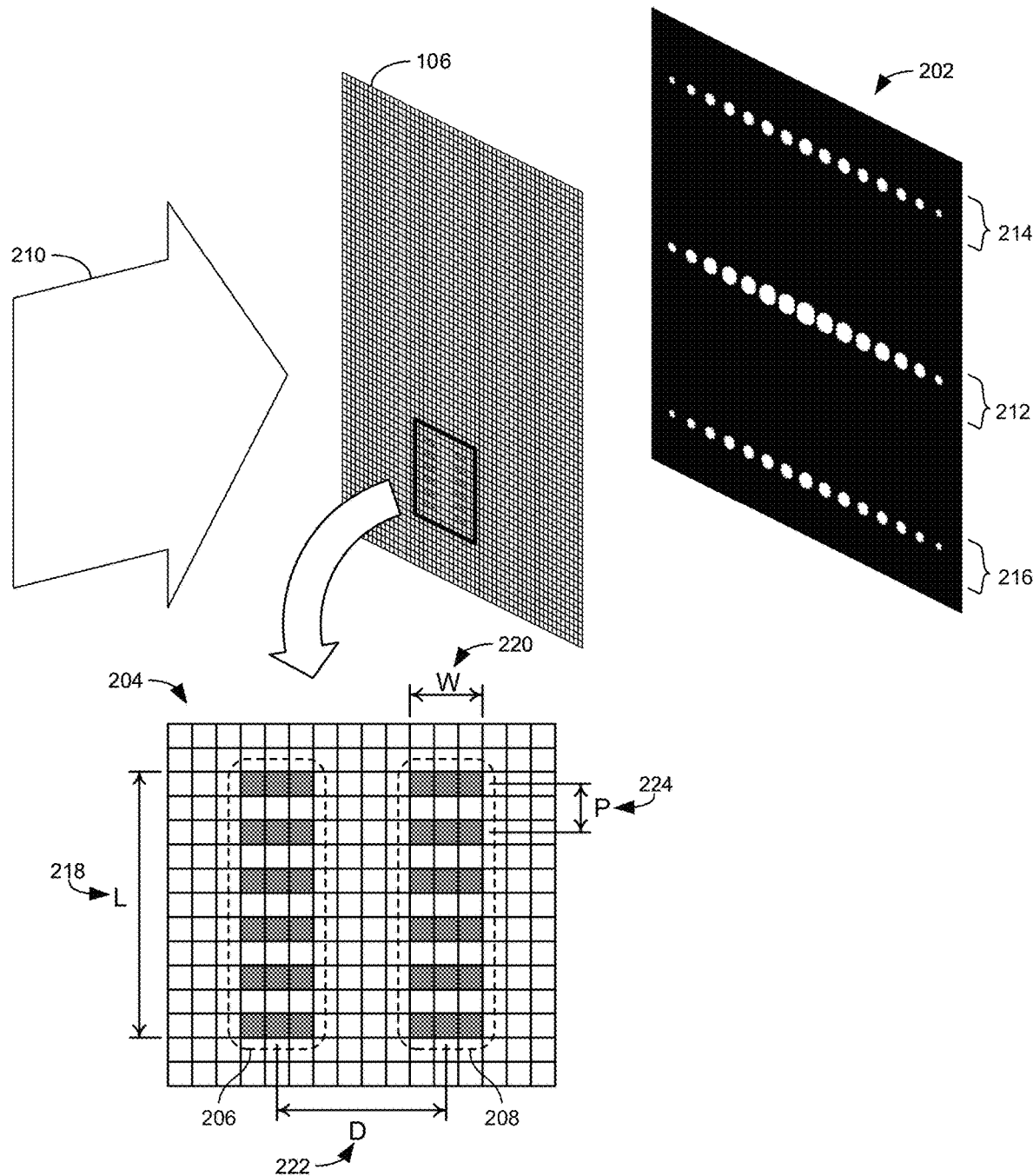
FIG. 2 illustrates the example the SLM of FIG. 1 producing a far-field diffraction pattern with the pixels of the SLM controlled according to an example double-slit grating pattern

FIG. 2 illustrates the example SLM 106 of FIG. 1 producing a far-field diffraction pattern 202 with the pixels of the SLM controlled according to an example double-slit grating pattern 204. In the illustrated example of FIG. 2, each square shown in the SLM 106 and shown in the enlarged view at the bottom of the figure is intended to represent a single pixel. As used herein, a double-slit grating pattern is a custom phase pattern (also known as a kinoform) that refers to a pattern in which two separate gratings 206, 208 are positioned adjacent one another and dimensioned to correspond to two parallel slits in a manner similar to the double-slit experiment. Thus, as shown in the illustrated example, the first grating 206 corresponds to a first slit and the second grating 208 corresponds to a second slit. Consistent with the double slit experiment, the first and second gratings 206, 208 extend parallel to one another in an elongate direction. Further, as shown in the illustrated example, the individual repeating elements of each grating 206, 208 extend perpendicular to the elongate direction of the slits or gratings 206, 208. In this example, the gratings 206, 208 are defined by small groups (e.g., individual rows) of pixels with alternating high and low voltages applied thereto corresponding to alternating high and low phase shifts to the incident input light 210. Further, in this example, all pixels outside of the narrow gratings 206, 208 have a same voltage applied to them as the low voltage pixels within the gratings 206, 208. Thus, in the illustrated example, the light (e.g., white) pixels represent pixels associated with a low voltage, whereas the dark (e.g., shaded) pixels represent pixels associated with a high voltage. Notably, representing lower voltage pixels with lighter shading and higher voltage pixels with darker shading is for purposes of clarity. In other convention could be used. In actual implementation, the greyscale image generated to define the voltage typically has darker shading corresponding with lower voltages and lighter shading corresponding with higher voltages.

In some examples, the low voltage corresponds to no voltage (e.g., V=0) and the high voltage corresponds to a voltage midway between no voltage and the maximum voltage (e.g., V=128, where Vmax=255). A voltage of V=0 is associated with a phase delay of 0, whereas a voltage of V=128 is associated with a phase delay of $\pi$. Thus, the individual groups of pixels in each grating 206, 208 are associated with alternating phase shifts of 0 and $\pi$. In other examples, the low and high voltages may be different than in the above example but still result in a phase difference in the different groups of pixels of approximately $\pi$ (e.g., the phase shifts of the low and high voltage groups of pixels alternate between $\eta/2$ and $3\pi/2$). In other examples, the voltages for the different groups of pixels are set to produce a phase difference relative to one another that is different than $\pi$.

Whereas an actual double-slit experiment produces a single interference pattern, due to the slits being mimicked by the gratings 206, 208, the far-field diffraction pattern 202 produced by the SLM 106 shown in FIG. 2 includes multiple interference patterns associated with different orders of diffraction caused by the gratings. Specifically, as represented in the illustrated example of FIG. 2, the far-field diffraction pattern 202 includes a 0 order interference pattern 212, a +1 order interference pattern 214, and a −1 order interference pattern 216. In some examples, there may be additional non-zero (e.g., +/−2, +/−3, etc.) order interference patterns. The 0 order pattern is aligned or centered with the double-slit grating pattern 204, while the higher order patterns are offset in the direction of the elongate length of the gratings 206, 208.

The particular spacing of the separate orders of interference patterns 212, 214, 216 and the particular nature of the corresponding sine wave interference pattern within each interference pattern 212, 214, 216 is a function of the length 218 of the gratings 206, 208 (corresponding to the length of slits in a standard double-sit experiment), the width 220 of the gratings 206, 208 (corresponding to the width of slits in a standard double-sit experiment), the distance 222 between the gratings 206, 208 (corresponding to the distance between slits in a standard double-sit experiment), and the pitch 224 of the groups of pixels within each grating 206, 208 (corresponding to the distance between any two adjacent high voltage groups of pixels or any two adjacent low voltage groups of pixels in each grating 206, 208). More particularly, the diffraction angle (defining the spacing of the different orders of interference patterns 212, 214, 216 depends inversely on the pitch 224 of the gratings 206, 208. Further, the nature of the alternating high and low intensity interference pattern depends on the length 218, width 220, and spacing (e.g., the distance 222) of the two gratings 206, 208 in the same way that the length, width, and spacing of slits in a traditional double-slit experiment affect the resulting interference pattern. Thus, while a particular example double-slit grating pattern 204 is shown in the illustrated example of FIG. 2, the length 218, width 220, spacing distance 222, and/or pitch 224 of the gratings 206, 208 in the double-slit grating pattern 204 may be adjusted in any suitable matter. Significantly, as represented in the illustrated example of FIG. 2, the double-slit grating pattern 204 is much smaller than the full size of the SLM 106.

Significantly, similar to a conventional double-slit experiment, the phase (e.g., location of peak intensity) in the sine wave pattern exhibited in the interference patterns 212, 214, 216 depends on the difference in average phase of each grating 206, 208. That is, as discussed above in connection with the double-slit experiment, measuring the phase of the interference patterns 212, 214, 216 provides a direct measure of the phase difference between the gratings 206, 208. In some examples, the higher order interference patterns 214, 216 are analyzed rather than the zero order interference pattern 212 because the zero order pattern 212 may include parasitic light from sources other than what was diffracted by the double-slit grating pattern 204. For example, the zero order interference pattern 212 may include light from gaps between pixels in the SLM 106 and/or light from the sides of the SLM 106. Because the higher (non-zero) order interference patterns 214, 216 are diffracted towards opposite sides of the zero order pattern 212, the higher order interference patterns 214, 216 will not be contaminated by these stray sources of light. In the illustrated example of FIG. 2, the difference in phase between the gratings 206, 208 is more properly characterized as the difference in the average phase of the gratings because not all pixels associated with each grating 206, 208 exhibit the same phase delay as a result of applying different (e.g., low or high) voltages to different ones of the pixels. Thus, if the low voltage corresponds to a phase of 0 and the high voltage corresponds to a phase of π, the average phase for each grating 206, 208 should be π/2. If the light incident on the SLM 106 is perfectly uniform, coherent, and collimated, and each pixel is controlled exactly as intended, the difference between the average phase of the two gratings 206, 208 should be zero. However, in practical reality, as described above, there are almost always imperfections in the input light source and imperfections in the control of the pixels of the SLM 106. As a result, there is likely to be some difference in phase of the light output by the two gratings 206, 208, which can be directly measured by measuring the phase of the intensity of light in the interference patterns 212, 214, 216. In this manner, the difference in phase between the pixels associated with the gratings 206, 208 can be determined. Stated differently, if the pixels in the first grating 206 have a phase alternating between 0 and π, and the pixels in the second grating 208 have a phase alternating between 0 and π+α, then the observed diffracted sine wave intensity profile in a resulting interference pattern (e.g., the patterns 212, 214, 216) will be shifted by a phase of α. If the pixels in both gratings were set to have alternating phases of 0 and π, then the α represents the amount of error in the input light and/or the SLM.

Notably, the difference in average phase between the gratings 206, 208 is specific to the particular gratings at the particular location within the SLM 106. Inasmuch as the double-slit grating pattern 204 is much smaller than the entire SLM 106, the double-slit experiment can be repeated multiple times with the double-slit grating pattern 204 being shifted each time. In an ideal case of a perfectly uniform plan wave illumination incident on the SLM 106 and a perfect SLM, the resulting diffraction pattern produced by any given double-slit grating pattern 204 at any given X-Y location of the SLM 106 should be the same as the same double-slit grating pattern 204 at any other location of the SLM 106. As there are almost always imperfections in the input light beam and/or in the SLM itself, stepping the double-slit grating pattern 204 across the SLM 106, as described above, enables the extent of such imperfections across the entire surface of the SLM 106 to be determined.

Figure 3:
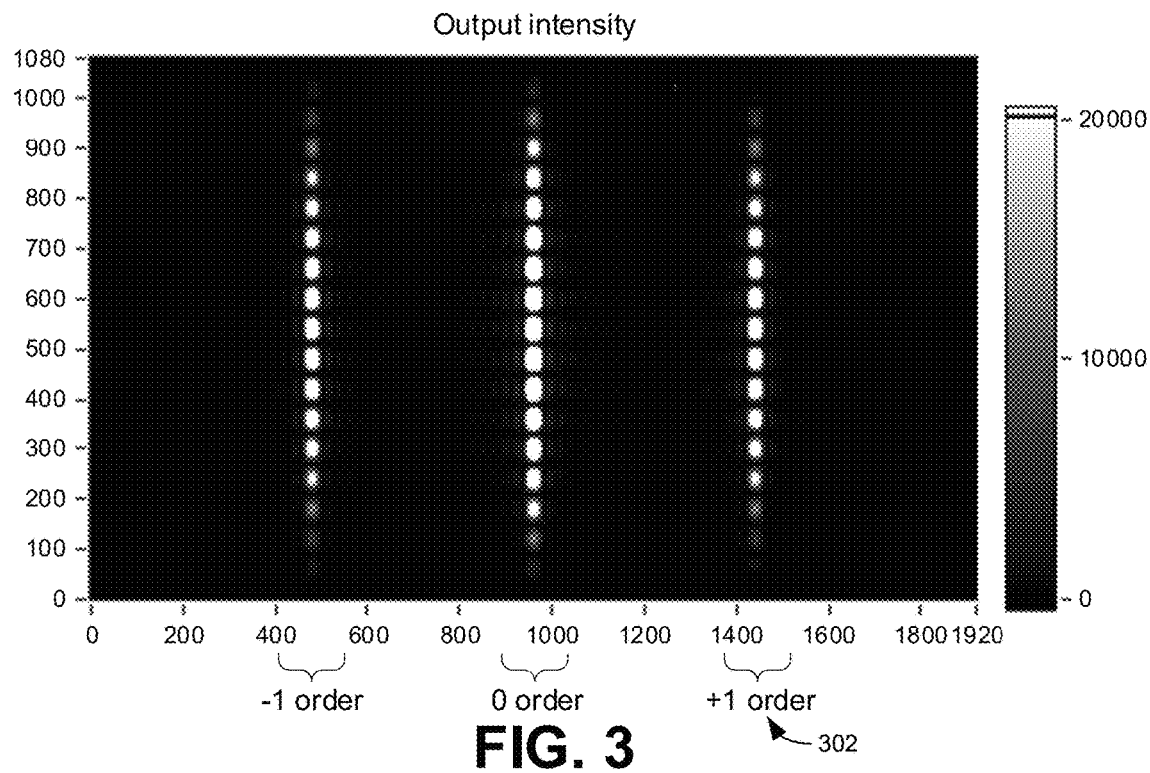
FIG. 3 illustrates another example far-field diffraction pattern produced by an example 1920×1080 SLM.
Figure 4:
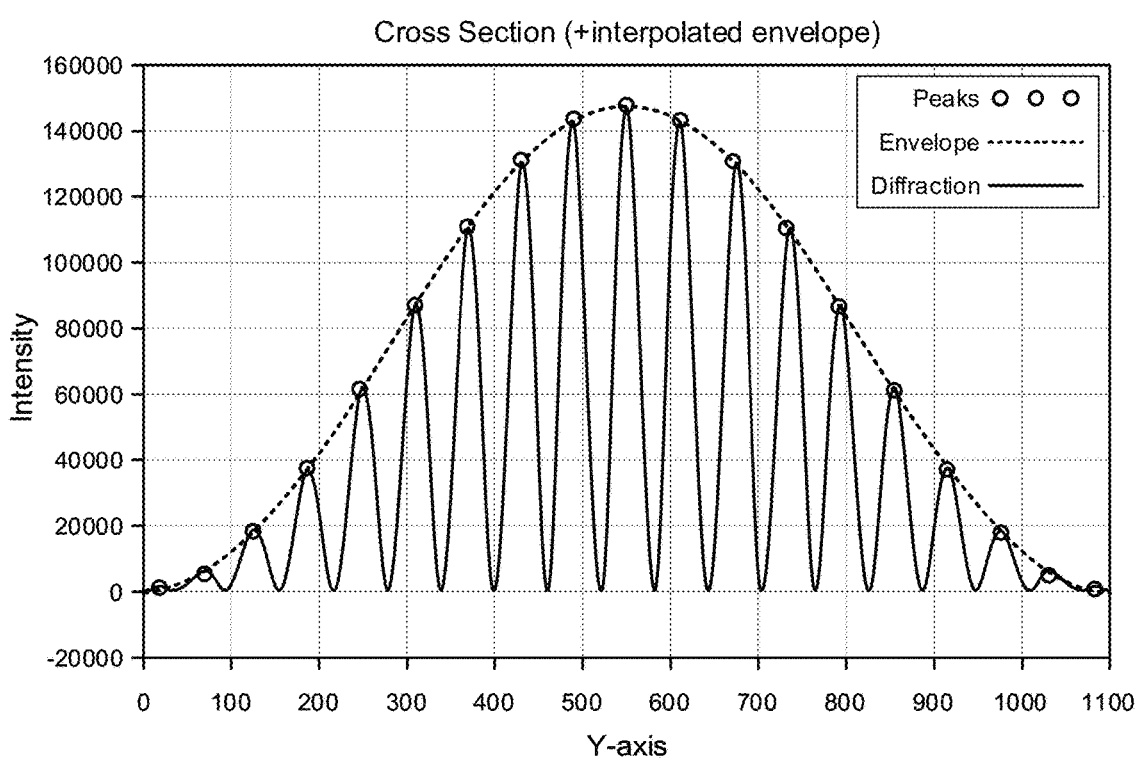
FIG. 4 is a graph illustrating an example apodised sine wave pattern corresponding to the cross-section of the +1 order interference pattern shown in FIG. 3.

FIG. 3 illustrates an example far-field diffraction pattern 300 produced by a 1920×1080 SLM with a double-slit grating pattern in which the individual gratings (corresponding to separate "slits") extend horizontally with a width of W=2 pixels, a length of L=80 pixels, a spacing distance of D=18 pixels, and a pitch of P=2 pixel. Consistent with the standard double-slit experiment, the cross-section of the +1 order interference pattern 302 is characterized by an apodised sine wave pattern shown in the graph 400 of FIG. 4. In some examples, the phase of the sine wave represented in the interference pattern 302 is determined by analyzing an image of the interference pattern 302 captured by the image sensor 122 of FIG. 1. More particularly, in some examples, the phase of the sine wave is determined by taking the fast Fourier transform (FFT) of the signal (e.g., the pixel information along the interference pattern 302 as captured by the image sensor 122), finding the peak frequency component, and measuring the phase as $\delta = a\tan(\text{Imag}/\text{Real})$.

Figure 5:
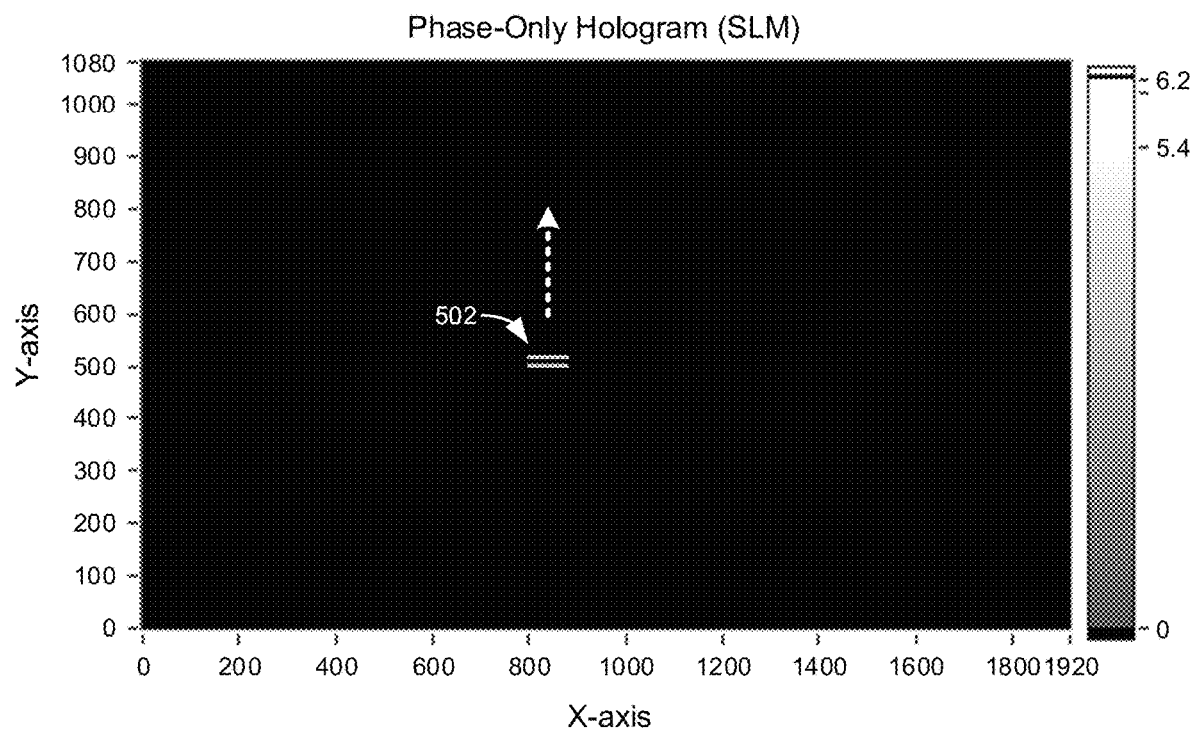
FIG. 5 illustrates an example double-slit grating pattern to scale relative to an example 1080×1920 SLM.

As mentioned above, a double-slit grating pattern 204 can be incrementally shifted or stepped across the SLM 106 to test different regions of the SLM 106 for imperfections. While such tests enable a determination of the phase difference between the pixels associated with the gratings at each particular location, this does not directly define the phase of the pixels relative to a ground truth or even relative to different pixels associated with different locations within the SLM 106. Accordingly, in some examples, the double-slit grating pattern 204 is incrementally stepped across the SLM 106 in a manner that each subsequent location can be linked or tied to the previous location until the relative phase of different regions across the entire surface of the SLM 106 can be defined relative to any other region. More particularly, FIG. 5 illustrates an example double-slit grating pattern 502 to scale relative to a 1080×1920 SLM. The alternating high and low phase shifts between different groups of pixels (e.g., the different high and low rows of pixels as shown in the gratings 206, 208 of FIG. 2) is not shown for the sake of clarity because of the size of the double-slit grating pattern 502. In some examples, as represented by the vertical arrow in the illustrated example, the double-slit grating pattern 502 is incrementally advanced in a direction that is perpendicular to the elongate length of the gratings in the double-slit grating pattern 502. Further, in some examples, the distance by which the double-slit grating pattern 502 is shifted in each successive test corresponds to the spacing distance 222 between the gratings in the double-slit grating pattern 502.

Figure 6:
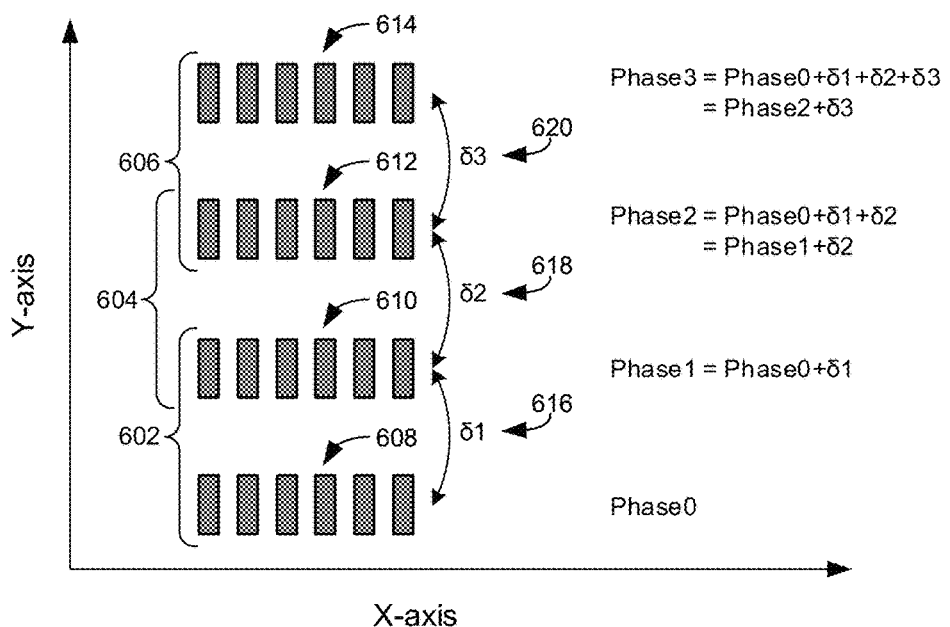
FIG. 6 illustrates three successive locations for the double-slit grating pattern as it is incrementally shifted across the SLM of FIGS. 1, 2, and/or 5.

More particularly, an example progression of the double-slit grating pattern 502 across the SLM 106 is demonstrated in FIG. 6. Specifically, FIG. 6 illustrates three successive locations 602, 604, 606 for the double-slit grating pattern 502 as it is incrementally shifted across the SLM 106. For purposes of explanation, the grating that is lower on the Y-axis, in the illustrated example, is referred to as the first grating in the double-slit grating pattern 502 and the grating that is higher on the Y-axis is referred to as the second grating. Thus, when the double-slit grating pattern 502 is at the first location 602, the first grating is at a first grating position 608 and the second grating is at a second grating position 610. When the double-slit grating pattern 502 is shifted to the second location 604, the first grating is at the second grating position 610 and the second grating is at a third grating position 612. Continuing on, when the double-slit grating pattern 502 is shifted to the third location 606, the first grating is at the third grating position 612 and the second grating is at a fourth grating position 614. Thus, in some examples, as the double-slit grating pattern 502 is shifted the first grating is moved to the location where the second grating was previously. In this manner, differences in phase between successive ones of the grating positions 612 can be combined to define the difference in phase between any two locations.

For instance, analyzing the interference pattern produced by the double-slit grating pattern 502 at the first location 602 enables the determination of a first phase difference 616 (δ1) between the pixels associated with the first and second grating positions 608, 610. Thus, if the phase associated with the first grating position 608 is defined as a reference or baseline phase (e.g., Phase0), the phase associated with the second grating position 610 can be defined as the summation of the reference phase plus the first phase difference 616 (e.g., Phase1=Phase0+δ1). Moving the double-slit grating pattern 502 to the second location 604 and repeating the analysis, a second phase difference 618 (δ2) between the pixels associated with the second and third grating positions 610, 612 can be determined. Furthermore, inasmuch as the phase associated with the second grating position 610 (Phase1) has already been defined with respect to the reference phase (Phase0), the phase associated with the third grating position 612 (Phase2) can also be defined with respect to the reference phase. This process can then be repeated to define the phase associated with the fourth grating position 614 (based on a third phase difference 620) and all subsequent grating positions in the SLM 106 along the line in which the double-slit grating pattern 502 is advanced with respect to the initial reference phase (Phase0). Stated generally, the phase associated with any particular grating position X can be defined as the summation of the reference phase (Phase0) and all phase differences at each step from the first grating position 608 to the particular grating position (e.g., PhaseX=Phase0+$\Sigma\delta_i$) At each incremental step of the double-slit grating pattern 502, the phase associated with the next grating position is the same as the phase of the previous grating position plus the phase difference between the next grating position and the previous grating position. Thus, the phase associated with any particular grating position can alternatively be defined as the summation of the phase of the previous grating position in the line along which the pattern is advanced and the phase difference at between the two gratings at the current location of the double-slit grating pattern 502 (e.g., PhaseX=Phase(X−1)+$\delta$(X)).

The above process enables the combining or stitching together of phase differences across the entire SLM 106. However, the above process is specific to a single line (e.g., one column) of locations along which the double-slit grating pattern is incrementally moved. To analyze the entire SLM 106, the entire process is repeated for a new line that is shift relative to the previous line. Whereas the shifting of the double-slit grating pattern along a particular line is defined by the spacing distance 222 between the two gratings, the shift in location of successive lines can be at any suitable spacing. For instance, in some examples, each successive line shifts by an amount corresponding to the length 218 of the gratings such that there is no overlap in the pixels used in the double-slit grating patterns incrementally stepped along each line. In other examples, each successive line shifts by an amount considerably less than the length 218 of the gratings (e.g., one half the length). In some examples, each successive line shifts by one pixel to maximize the overlap between the successive lines.

Figure 7:
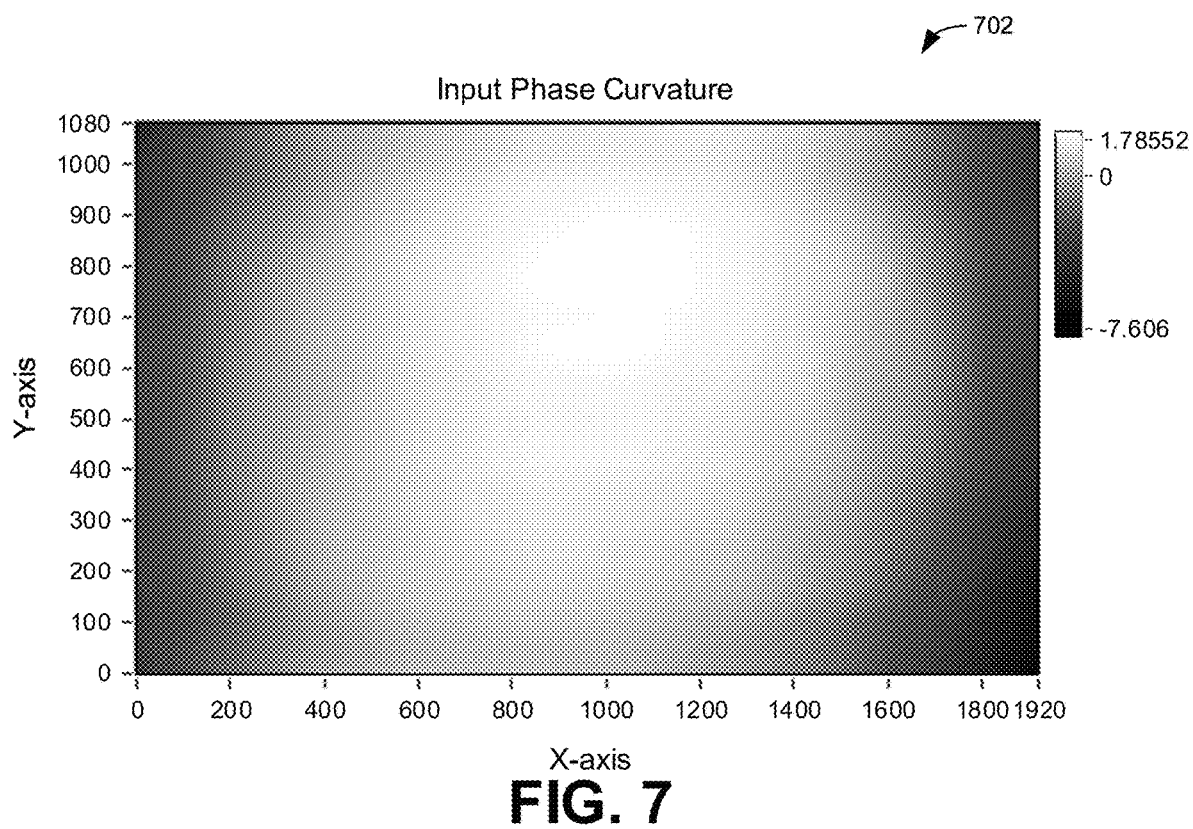
FIG. 7 illustrates an example phase curvature that characterizes the input wavefront incident on the example SLM of FIGS. 1, 2, and/or 5.

Analyzing the output of the double-slit grating pattern at each location along each line defines the phase relationship of all pixels in the direction of the lines (relative to the reference phase (Phase0)). However, there is still a need to define the phase relationship of the pixels in the direction perpendicular to lines. Accordingly, in some examples, the double-slit grating pattern is rotated by 90 degrees and the process is repeated one additional time along a line that extends perpendicular to all the previous lines analyzed. Only one line in this second direction is need to then fully define the phase relationships between any two regions of pixels in the SLM 106. More particularly, once the phase relationships of all pixels across the perpendicular line are defined, the phases of each position across every parallel line is adjusted relative to a single reference phase in a single line so that the phase relationships across all pixels are defined in by the X and Y directions relative to a single reference point. FIG. 7 illustrates an example phase curvature 702 that fully defines the phase relationship of an example SLM. More particularly, the example SLM used to generate the example phase curvature 702 was illuminated with a nominally plane wave. However, if the input light beam was truly a uniform plane wave, the phase curvature would show a consistent value across the entire SLM. As can be seen, there are phase differences across the SLM of over 9 radians or nearly 3$\pi$, thereby indicating the incoming light beam was not properly collimated and/or perfectly coherent.

Figure 8:
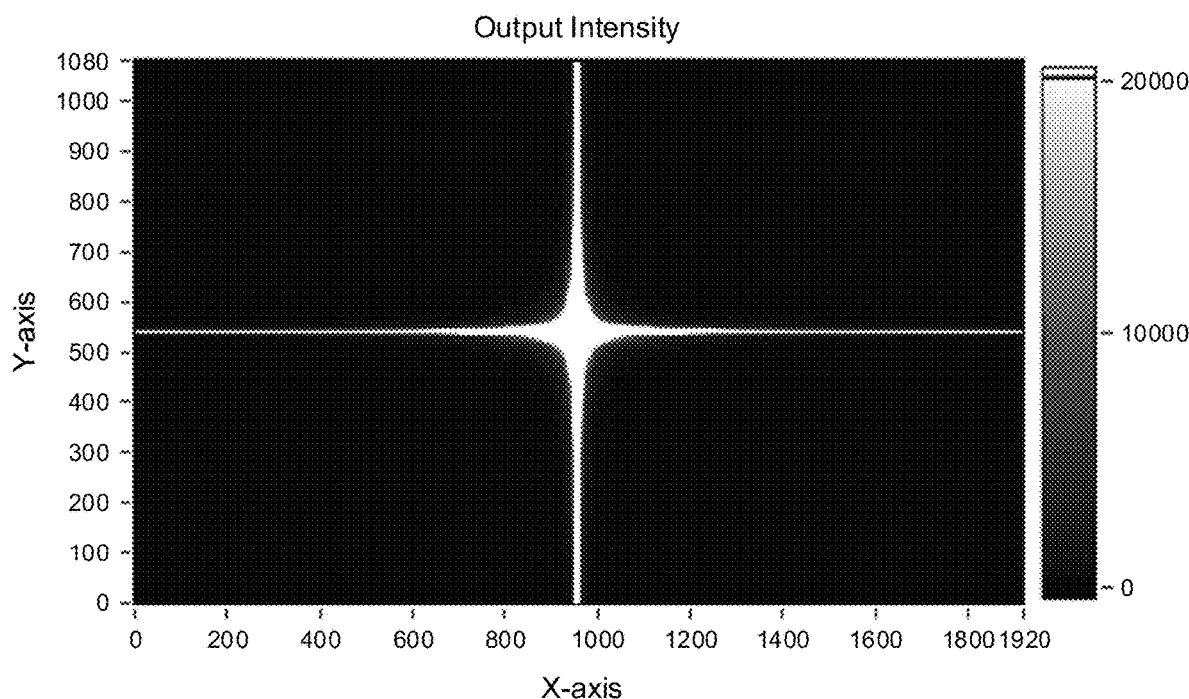
FIG. 8 represents an example output of an SLM programmed to model a simple lens receiving a plane wave of light before being corrected in accordance with teachings disclosed herein.
Figure 9:
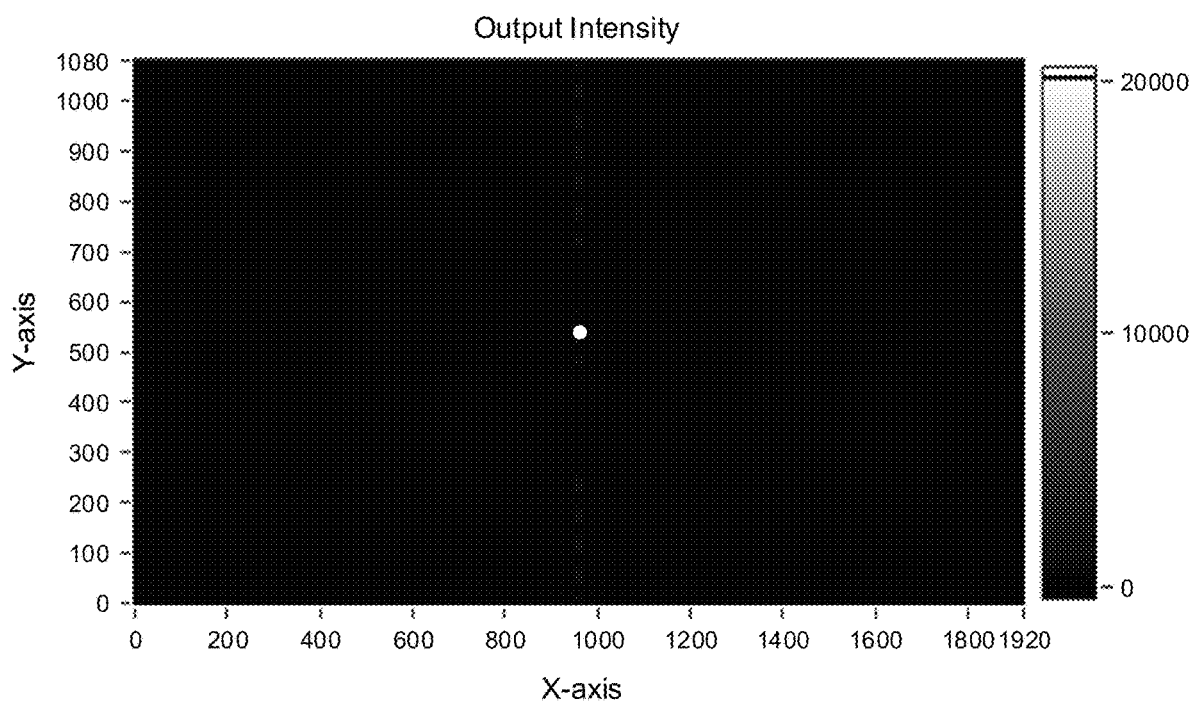
FIG. 9 represents an example output of an SLM programmed to model a simple lens as in FIG. 8 but after being corrected in accordance with teachings disclosed herein.

While it may not be possible to correct the imperfections in the light beam because of limitations in the fabrication and alignment of the light source 102 and optical elements 104 (FIG. 1) used to generate the light beam, the phase curvature determined from the above process can be programmed into the SLM to effectively eliminate the imperfections represented in the curvature, thereby compensating for such imperfections. The improvements achieved by this process are demonstrated with reference to FIGS. 8 and 9. Specifically, FIGS. 8 and 9 represent the output of an SLM programmed to model a simple lens receiving a plane wave of light both before (FIG. 8) and after (FIG. 9) the SLM has been corrected in accordance with teachings disclosed herein. More particularly, FIGS. 8 and 9 illustrate an example intensity profile seen at the focal plane of the modelled lens. A simple lens being illuminated by a uniform plane wave of light, will cause the light to converge at a single point at the focal plane of the lens. Thus, the expected output of the SLM at the focal plane, as represented in FIGS. 8 and 9, should be a single point. However, as can be seen in the uncorrected output shown in FIG. 8 there is significant aberrations and/or distortions from what is expected. By contrast, once the SLM is corrected, as disclosed herein, the output (as shown in FIG. 9) includes a single dot as expected. Notably, the dot in FIG. 9 has been enlarged in the illustrated example for purposes of explanation, but actually resolves to a single point associated with a single pixel, indicating that the corrections are able to compensate for the imperfections that produce the output shown in FIG. 8.

The phase curvature 702 of FIG. 7 defines or characterizes the true nature of the wavefront of the input beam of light (e.g., the input wavefront 108 of FIG. 1. Stated differently, the phase curvature 702 generally defines the DC terms of Equations 1 and 2. However, the AC terms of Equations 1 and 2 also need to be known to fully define the phase of the output wavefront 110 of FIG. 1. As discussed above, the AC terms correspond to the phase response of the individual pixels of the SLM 106. Generating the phase curvature 702 shown in FIG. 7, as outlined above, is based on incrementally shifting a double-slit grating pattern across different regions of the SLM 106 until the phase differences between each different region is determined. In performing this procedure, the low and high voltages applied to the pixels are kept consistent as the double-slit grating pattern is moved from one location to the next, which is why the expected output across the SLM would be a phase curvature that is perfectly uniform. However, measuring the phase response of each pixel (or particular region of pixels) involves varying the voltage applied to the pixels at a fixed location or region.

In some examples, measuring the phase response of an SLM 106 is performed after having already calibrated the SLM 106 to compensate for imperfections in the input light beam as described above to remove any background phase difference and establish a reference phase (Phase0) for V=0. This is performed by defining a double-slit grating pattern 204 with both gratings having voltage pixels values alternating between 0 and 128 and then measuring the phase difference as outlined above. This phase difference is used as a reference phase difference ($\delta$0) that is to be subtracted from all subsequent measurements. Although a greyscale value of 128 is identified for the high voltage in the above example, any suitable value may be used. However, values close to 128 should correspond to phase shifts of close to π, which will increase (e.g., maximize) the diffraction efficiency.

Once the reference phase difference is determined for the particular location of the double-slit grating pattern 204 under analysis, the greyscale values defining the high and low voltages for the gratings can be dynamically changed to iterate through all greyscale values. In some examples, as the greyscale values are adjusted (e.g., incremented) the high greyscale value in both gratings 206, 208 of the double-slit grating pattern 204 are kept the same (e.g., the high greyscale values match in both gratings 206, 208). By contrast, in some examples, the low greyscale value for the second grating 208 is offset an amount higher than the low greyscale value for the first grating 208. In some examples, the amount of the offset corresponds to the rate at which the greyscale values are incremented. Thus, if the greyscale values are incremented by 1 at each iteration, the low greyscale value for the second grating 208 will be higher than the low greyscale value for the first grating 206 by 1. For instance, in the first iteration (after establishing the reference phase difference based on a high and low greyscale values of 0 and 128 in both gratings 206, 208), the first grating 206 includes pixels that alternate between high and low greyscale values of 1 and 129 and the second grating 208 includes pixels that alternate between high and low greyscale values of 2 and 129. In the second iteration, all greyscale values are incremented by one such that the first grating 206 includes pixels that alternate between high and low greyscale values of 2 and 130 and the second grating 208 includes pixels that alternate between high and low greyscale values of 3 and 130. Stated generally, the process iterates through all N=1 to 255 with the low and high greyscale values for the first grating 206 defined as N and N+128 (for values of N up to 127) and defined as N and (N+128) modulo 255 (for values of N above 127). The low and high greyscale values for the second grating 208 defined as N+A and N+128 (for values of N up to 127) and defined as N and (N+128) modulo 255 (for values of N above 127), where A is the offset amount and increment step (e.g., A=1). In the foregoing definitions, if either the N+128 term or the N+A term exceeds 255, the amount above 255 is used as the greyscale value for the relevant pixels in the relevant iteration of the process. For example, if N=128, then N+128=256 and the resulting greyscale value used is 1. Thus, as N increments up to and then past 128, the resulting greyscale value for N+128 drops to 1 and then continues to increment upwards from there. Thus, as N increments from 1 to 127, the pixels associated with higher greyscale values in both gratings 206, 208 begin at a mid-range value (e.g., 129 in both gratings 206, 208) and increase to the maximum value (e.g., 255 in both gratings 206, 208) while the pixels associated with the lower greyscale values begin near the minimum value (e.g., 1 for the first grating 206 and 2 for the second grating 208) and increase to near mid-range values (e.g., 127 for the first grating 206 and 128 for the second grating 208). Once N reaches 128 the pixels associated with the high greyscale values and the pixels associated with the low greyscale values reverse due to the values for the previously high voltage pixels dropping to 1 and incrementing on from there. That is, as N increments from 128 to 255, the pixels initially (for N=1 to 127) associated with the higher greyscale values in both gratings 206, 208 continue from the near minimum value (e.g., 1 in both gratings 206, 208) and increase toward a mid-range value (e.g., 128 in both gratings 206, 208) while the pixels initially (for N=1 to 127) associated with the lower greyscale values continue to increment from near the mid-range value (e.g., 128 for the first grating 206 and 129 for the second grating 208) and increase to near the maximum value (e.g., 127 for the first grating 206 and 128 for the second grating 208). In the very last iteration in the above example (e.g., when N=255), the pixels initially associated with the low greyscale values in the second grating 208 (defined by N+A) reverts back to the minimum value of 1 because N+A (where N=255 and A=1_equals 256, which is beyond valid range of 0 to 255 for greyscale values.

At each iteration in the above process (e.g., as N increments from 1 to 255), the phase difference (δA) between the two gratings 206, 208 is measured based on the phase of the sine wave represented in the resulting interference pattern (e.g., the patterns 212, 214, 216 of FIG. 2) as described above. More particularly, as discussed above, the phase difference is more accurately described as the difference of the average phase of the two gratings 206, 208, which may be expressed mathematically as follows:

$$\delta = 0.5[\text{Phase}(N) + \text{Phase}(N + 128)] - \qquad \text{Eq. 6}$$
$$0.5[\text{Phase}(N + A) + \text{Phase}(N + 128)] =$$
$$0.5[\text{Phase}(N) - \text{Phase}(N + A)]$$

Figure 10:
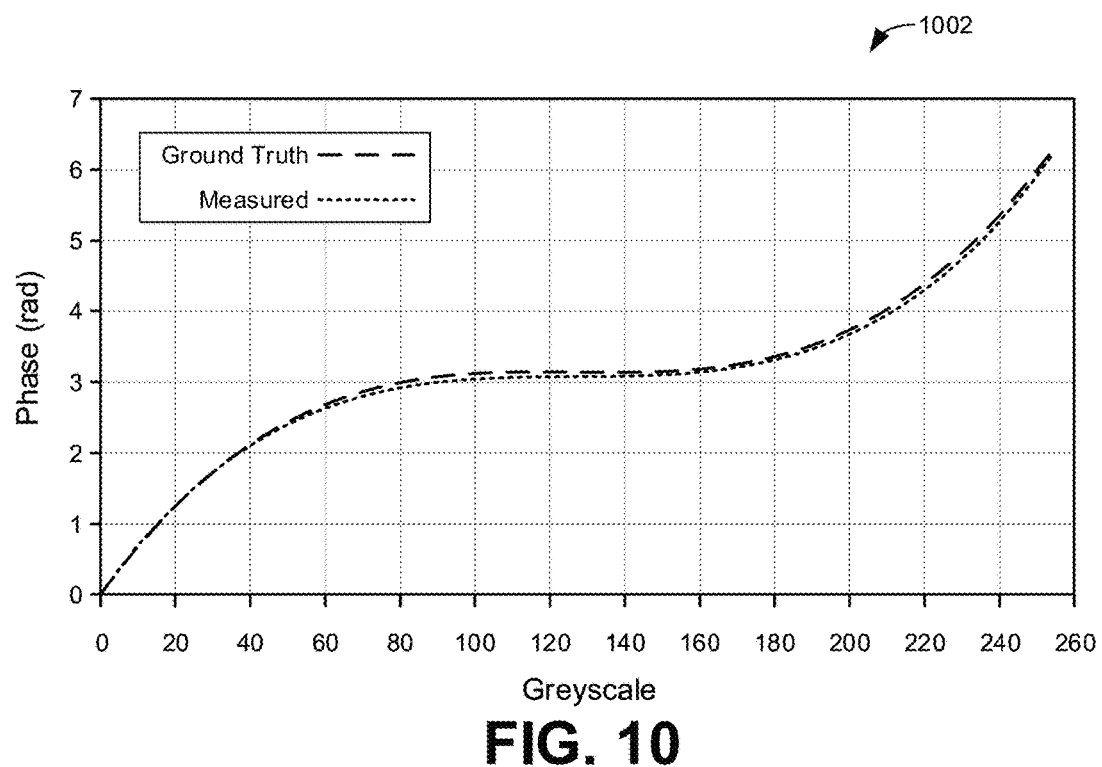
FIG. 10 shows an example phase response transfer curve generated in accordance with teachings disclosed herein relative to known ground truth for the transfer curve.

Once all 256/A phase differences have been measured and the reference phase difference (δ0) is subtracted from each, the results are integrated to generate the final transfer curve for the pixels associated with the double-slit grating pattern 204 under analysis. For example, assuming the greyscales values were incremented by A=1, the resulting transfer curve is defined as Phase(1)=2δ1, Phase(2)=2*[δ1+δ2], ..., Phase(N)=2*[δ1+δ2+ ... +δN]. FIG. 10 shows an example phase response transfer curve 1002 generated based on the methodologies disclosed herein relative to known ground truth for the transfer curve. As can be seen, the measured values closely follow the ground truth known phase response.

The example process is for a specific double-slit grating pattern 204 at a particular location on the SLM 106. The double-slit grating pattern 204 can be iteratively moved to different locations across the SLM 106 and the process repeated until a phase response transfer curve has been defined for every region of the SLM 106. Inasmuch as the transfer curve at each location is determined independently, there are no limitations on the spacing between each location of the SLM 106 for which a transfer curve is generated. Thus, in some examples, the double-slit grating pattern 204 is shifted one pixel at a time and the process repeated. In other examples, the double-slit grating pattern 204 is shifted by more than one pixel. In some examples, the entire set of transfer functions corresponding to all regions across the SLM 106 are stored in a lookup table or other suitable data structure for retrieval by the SLM control circuitry 118 when generating greyscale images intended to control the SLM to produce a particular output (e.g., the output wavefront 110).

The phase response transfer functions generated through the above process correspond to the AC terms in Equations 1 and 2. The transfer functions, in conjunction with the phase curvature defining the input wavefront 108 (e.g., corresponding to the DC terms in Equations 1 and 2), fully characterize the SLM 106 and the light incident thereto. As a result, the SLM can be calibrated or tuned to compensate for imperfections and in the input light beam and for inconsistencies in phase response of different pixels at different locations of the SLM 106. Thus, output images (e.g., the image 114) can be produced at a much higher quality than otherwise possible. A specific example of this is the ability to dynamically create one or more transform limited focused aberration-free spots that can be steered.

Figure 11:
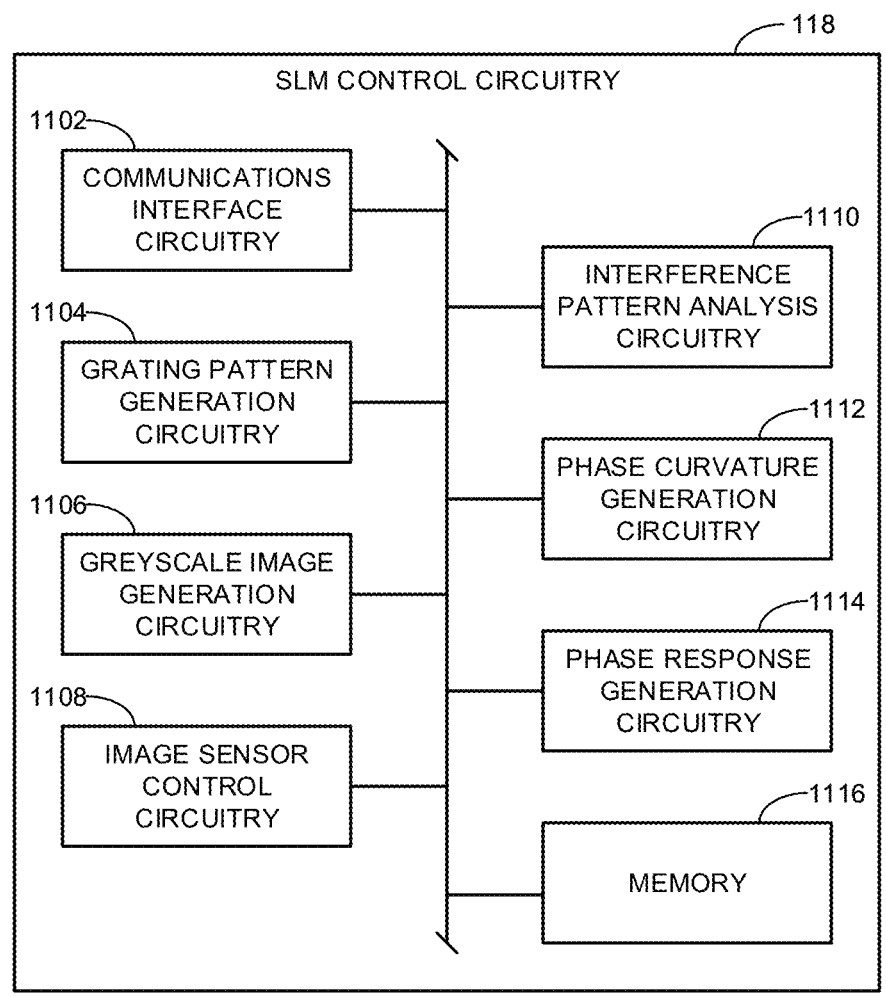
FIG. 11 illustrates an example implementation of the example SLM control circuitry of FIG. 1.

FIG. 11 illustrates an example implementation of the example SLM control circuitry 118 of FIG. 1. As shown in the illustrated example, the SLM control circuitry 118 includes example communications interface circuitry 1102, example grating pattern generation circuitry 1104, example greyscale image generation circuitry 1106, example image sensor control circuitry 1108, example interference pattern analysis circuitry 1110, example phase curvature generation circuitry 1112, example phase response generation circuitry 1114, and one or more example memories 1116.

The example communications interface circuitry 1102 enables communications between the SLM control circuitry 118 and other components in the SLM system 100 of FIG. 1. For instance, in some examples, the SLM control circuitry 118 communicates with the light control circuitry 116 via the communications interface circuitry 1102. In other examples, the SLM control circuitry 118 and the light control circuitry 116 operate independently without communicating with one another. Further, in some examples, the SLM control circuitry 118 uses the communications interface circuitry 1102 to communicate with (e.g., send control commands and/or greyscale images 120) to the SLM 106. In some examples, the SLM control circuitry 118 uses the communications interface circuitry 1102 to communicate with the image sensor 122 to, for example, send commands that cause the image sensor 122 to capture an image (e.g., of the far-field diffraction pattern 202 of FIG. 2). Further, the SLM control circuitry 118 receives images captured by the image sensor 122 via the communications interface circuitry 1102. Although the communications interface circuitry 1102 is represented by a single block in FIG. 11, in some examples, the communications interface circuitry 1102 includes multiple separate interfaces (e.g., one interface to communicate with the SLM 106 and a separate interface to communicate with the image sensor 122).

The example grating pattern generation circuitry 1104 of the illustrated example defines and/or determines parameters for the double-slit grating pattern 204 used in accordance with teachings disclosed herein. More particularly, in some examples, the grating pattern generation circuitry 1104 defines and/or determines the length 218, width 220, spacing distance 22, and pitch 224 of the gratings 206, 208 in the double-slit grating pattern 204. Further, in some examples, the grating pattern generation circuitry 1104 defines and/or determines the high and low greyscale values associated with the gratings 206, 208. In some examples, the grating pattern generation circuitry 1104 defines one or more of the above parameters based on user input. That is, in some examples, a user may set the particular parameter, which is then stored in the example memory 1116, and the example grating pattern generation circuitry 1104 retrieves the set value for the particular parameter when needed.

The example greyscale image generation circuitry 1106 generates greyscale images (e.g., the greyscale image 120) that are provided to the SLM 106 to control operation of the SLM 106. More particularly, as described above, the greyscale images include greyscale pixel values for each pixel of the SLM 106 that define a particular voltage to be applied to each corresponding pixel. In some examples, the greyscale image generation circuitry 1106 generates a greyscale image 120 that includes greyscale values defined by and corresponding to a double-slit grating pattern defined by the example grating pattern generation circuitry 1104. In some examples, the greyscale image generation circuitry 1106 defines the particular position and/or location within the greyscale image 120 where the double-slit grating pattern is to be positioned. Additionally or alternatively, in some examples, the grating pattern generation circuitry 1104 defines the position and/or location of the double-slit grating pattern within the greyscale image 120. In some examples, different greyscale images containing double-slit grating patterns at particular locations are generated in advance and stored in the memory 1116. In some such examples, the greyscale image generation circuitry 1106 retrieves the greyscale images from the memory 1116 when needed.

The example image sensor control circuitry 1108 generates and/or provides commands and/or instructions to the image sensor 122 to control the operation of the image sensor 122. For instance, in some examples, the image sensor control circuitry 1108 causes the image sensor 122 to capture an image of a far-field diffraction pattern 202 after the greyscale image generation circuitry 1106 has generated and provided a greyscale image 120 to the SLM 106 that includes a double-slit gratings pattern 204. In this manner, the interference pattern produced by the SLM 106 based on the double-slit grating pattern can be captured and analyzed in accordance with teachings disclosed herein.

The example interference pattern analysis circuitry 1110 analyzes the images captured by the image sensor 122. More particularly, when a captured image includes the diffraction pattern 202, the interference pattern analysis circuitry 1110 analyzes one or more of the interference patterns 212, 214, 216 contained therein to determine a phase of the interference pattern. As discussed above, the phase of the interference pattern directly corresponds to the phase difference between the two gratings 206, 208 in the double-slit grating pattern 204. Thus, the example interference pattern analysis circuitry 1110 inherently measures or determines the phase difference between the two gratings 206, 208 as a result of determining the phase of the interference pattern.

The example phase curvature generation circuitry 1112 generates a phase curvature 702 based on the phase difference measurements of the interference pattern analysis circuitry 1110. More particularly, in some examples, the phase curvature generation circuitry 1112 defines a reference or baseline phase at a reference location on the SLM 106 and further defines or sets phase values for different locations on the SLM 106 relative to the reference phase at the reference location. In some examples, this is accomplished by combining or bootstrapping the phase differences between a series of different positions on the SLM 106 associated with different locations of double-slit grating pattern as the double-slit grating pattern is incrementally stepped across the SLM 106. The example phase curvature generation circuitry 1112 generates a full phase curvature 702 by stitching together or bootstrapping all measurements of phase differences captured across the entire surface of the SLM 106. In some examples, the phase curvature 702 defines the input wavefront 108 incident upon the SLM 106. Thus, the phase curvature generation circuitry 1112 is able to characterize or define a input light beam by generating the phase curvature 702 as described above. The example phase curvature generation circuitry 1112 further causes the phase curvature 702 to be stored in the example memory 1116 to be retrieved as needed. More particularly, in some examples, the greyscale image generation circuitry 1106 uses the phase curvature 702 to adjust greyscale values in an greyscale image to compensate for imperfections in the incoming light beam incident on the SLM 106. Additionally or alternatively, in some examples, the particular algorithms by which the greyscale image generation circuitry 1106 generates greyscale images to control the SLM 106 is calibrated based on the phase curvature 702. This is, in some examples, the operations of the greyscale image generation circuitry 1106 are modified to automatically compensate for the imperfections in the input light beam by incorporating the phase variations represented in the phase curvature 702 directly into its algorithms.

The example phase response generation circuitry 1114 generates a phase response transfer curve 1002 based on the phase difference measurements of the interference pattern analysis circuitry 1110. More particularly, the phase response generation circuitry 1114 combines different phase differences associated with a double-slit grating pattern as the greyscale values defined for the pattern are incremental changed across the range of possible values to generate the transfer curve. In some examples, the phase response generation circuitry 1114 generates different phase response transfer curves for different locations of the SLM 106. The example phase response generation circuitry 1114 further causes the different phase response transfer curves to be stored in the example memory 1116 (e.g., in a lookup table or other suitable data structure) to be retrieved as needed. More particularly, in some examples, the greyscale image generation circuitry 1106 uses the different phase response transfer curves when generating a greyscale image so that the correct greyscale value for an intended phase delay is selected for the greyscale image.

In some examples, the SLM control circuitry 118 includes means for generating a greyscale image. For example, the generating a greyscale image may be implemented by the example greyscale image generation circuitry 1106. In some examples, the example greyscale image generation circuitry 1106 may be implemented by machine executable instructions such as that implemented by at least block 1202 of FIG. 12 and blocks 1402 and 1418 of FIG. 14 executed and/or instantiated by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the example greyscale image generation circuitry 1106 is implemented by other hardware logic circuitry, hardware implemented state machines, and/or any other combination of hardware, software, and/or firmware. For example, the greyscale image generation circuitry 1106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the SLM control circuitry 118 includes means for determining a phase difference between gratings of a double-slit grating pattern. For example, the means for determining a phase difference may be implemented by the example interference pattern analysis circuitry 1110. In some examples, the example interference pattern analysis circuitry 1110 may be implemented by machine executable instructions such as that implemented by at least block 1206 of FIGS. 12, 1304, 1306, 1308, 1310, and 1312 of FIG. 13, and block 1408 of FIG. 14 executed and/or instantiated by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the example interference pattern analysis circuitry 1110 is implemented by other hardware logic circuitry, hardware implemented state machines, and/or any other combination of hardware, software, and/or firmware. For example, the interference pattern analysis circuitry 1110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the SLM control circuitry 118 includes means for generating a phase curvature. For example, the means for generating a phase curvature may be implemented by the example phase curvature generation circuitry 1112. In some examples, the example phase curvature generation circuitry 1112 may be implemented by machine executable instructions such as that implemented by at least block 1216 and 1220 of FIG. 12 executed and/or instantiated by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the example phase curvature generation circuitry 1112 is implemented by other hardware logic circuitry, hardware implemented state machines, and/or any other combination of hardware, software, and/or firmware. For example, the phase curvature generation circuitry 1112 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the SLM control circuitry 118 includes means for controlling an image sensor. For example, the means for controlling an image sensor may be implemented by the example image sensor control circuitry 1108. In some examples, the example image sensor control circuitry 1108 may be implemented by machine executable instructions such as that implemented by at least block 1302 of FIG. 13 and block 1406 of FIG. 14 executed and/or instantiated by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the example image sensor control circuitry 1108 is implemented by other hardware logic circuitry, hardware implemented state machines, and/or any other combination of hardware, software, and/or firmware. For example, the image sensor control circuitry 1108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the SLM control circuitry 118 of FIG. 1 is illustrated in FIG. 11, one or more of the elements, processes, and/or devices illustrated in FIG. 11 may be combined, divided, re-arranged, omitted, eliminated, and/or implemented in any other way. Further, the example communications interface circuitry 1102, the example grating pattern generation circuitry 1104, the example greyscale image generation circuitry 1106, the example image sensor control circuitry 1108, the example interference pattern analysis circuitry 1110, the example phase curvature generation circuitry 1112, the example phase response generation circuitry 1114, the example memory 1116 and/or, more generally, the example SLM control circuitry 118 of FIG. 1, may be implemented by hardware, software, firmware, and/or any combination of hardware, software, and/or firmware. Thus, for example, any of the example communications interface circuitry 1102, the example grating pattern generation circuitry 1104, the example greyscale image generation circuitry 1106, the example image sensor control circuitry 1108, the example interference pattern analysis circuitry 1110, the example phase curvature generation circuitry 1112, the example phase response generation circuitry 1114, the example memory 1116, and/or, more generally, the example SLM control circuitry 118, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example communications interface circuitry 1102, the example grating pattern generation circuitry 1104, the example greyscale image generation circuitry 1106, the example image sensor control circuitry 1108, the example interference pattern analysis circuitry 1110, the example phase curvature generation circuitry 1112, the example phase response generation circuitry 1114, and/or the example memory 1116 is/are hereby expressly defined to include a non-transitory computer readable storage device or storage disk such as a memory, a digital versatile disk (DVD), a compact disk (CD), a Blu-ray disk, etc., including the software and/or firmware. Further still, the example SLM control circuitry 118 of FIG. 1 may include one or more elements, processes, and/or devices in addition to, or instead of, those illustrated in FIG. 11, and/or may include more than one of any or all of the illustrated elements, processes and devices.

Figure 12:
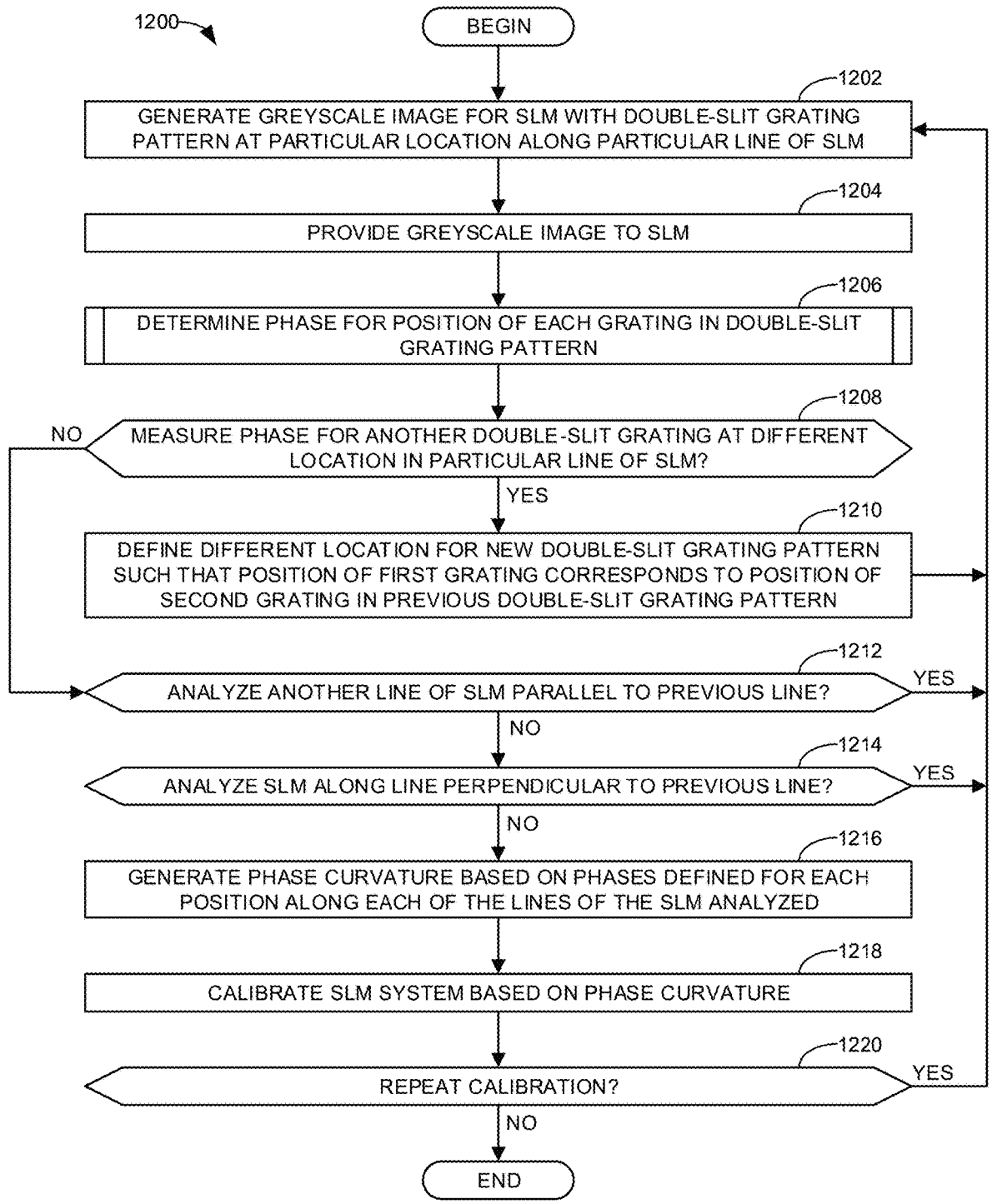
FIG. 12-14 are flowcharts representative of example machine readable instructions that may be executed and/or instantiated by example processor circuitry to implement the example SLM control circuitry of FIGS. 1 and/or 11.
Figure 13:
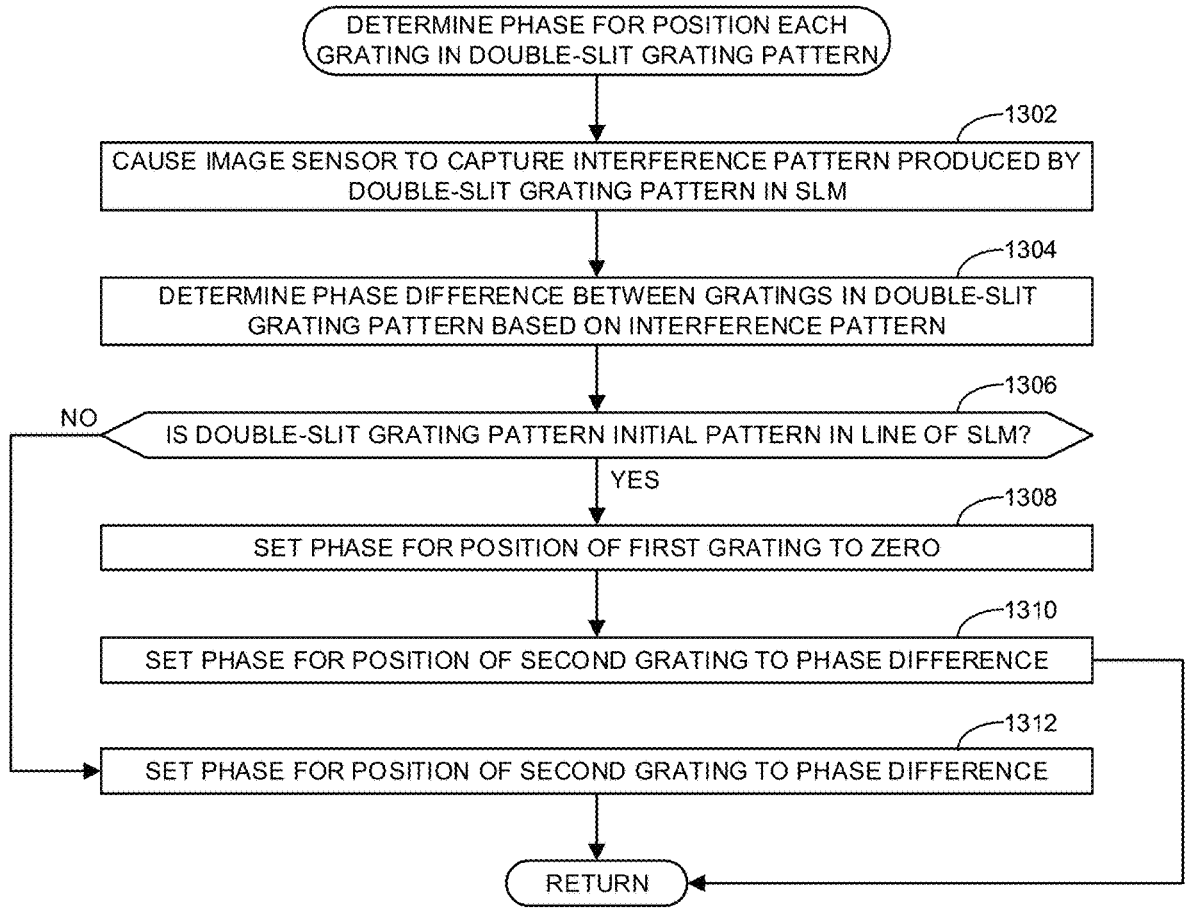
Figure 14:
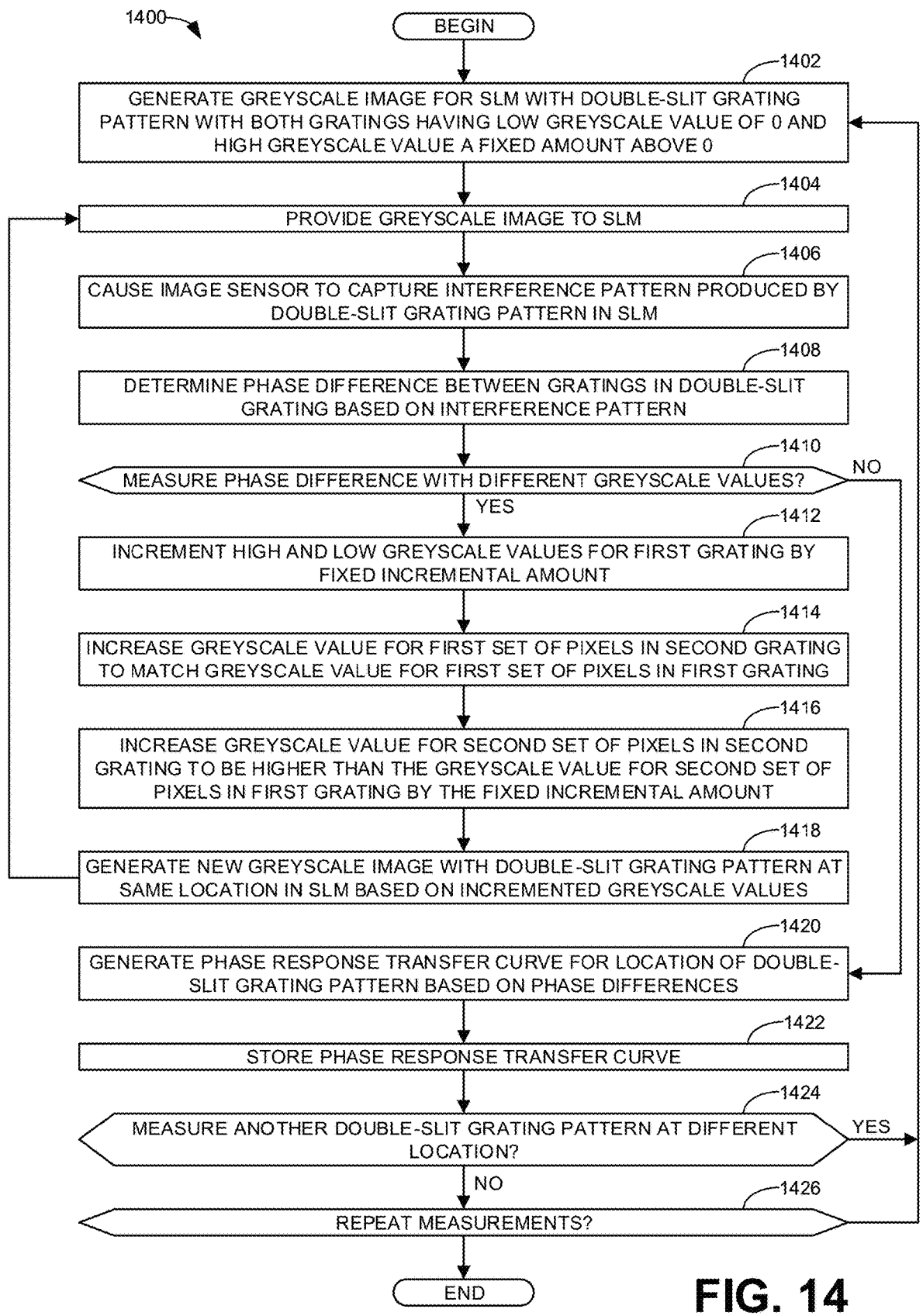

Flowcharts representative of example hardware logic circuitry, machine readable instructions, hardware implemented state machines, and/or any combination thereof for implementing the SLM control circuitry 118 of FIG. 1 are shown in FIGS. 12-14. The machine readable instructions may be one or more executable programs or portion(s) of an executable program for execution and/or instantiation by processor circuitry, such as the processor circuitry 1512 shown in the example processor platform 1500 discussed below in connection with FIG. 15 and/or the example processor circuitry discussed below in connection with FIGS. 16 and/or 17. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed and/or instantiated by one or more hardware devices other than the processor circuitry and/or embodied in firmware or dedicated hardware. The machine readable instructions may be distributed across multiple hardware devices and/or executed and/or instantiated by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 12-14, many other methods of implementing the example SLM control circuitry 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 12-14 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 12 is a flowchart representative of example machine readable instructions and/or example operations 1200 that may be executed and/or instantiated by processor circuitry to enable the SLM control circuitry 118 to generate a phase curvature (e.g., the phase curvature 702 of FIG. 7) that characterizes the input wavefront 108 of light incident on the SLM 106 and/or the calibrate the SLM system 100 to compensate for imperfections in the input wavefront 108. The machine readable instructions and/or operations 1200 of FIG. 12 begin at block 1202, where the example greyscale image generation circuitry 1106 generates a greyscale image for the SLM 106 with a double-slit grating pattern (e.g., the double-slit grating pattern 204 of FIG. 2) at a particular location along a particular line of the SLM 106. At block 1204, the example communications interface circuitry 1102 provides the greyscale image to the SLM 106. At block 1206, the SLM control circuitry 118 (using the interference pattern analysis circuitry 1110) determines a phase for the position of each grating (e.g., the gratings 206, 208 of FIG. 2) in the double-slit grating pattern 204. Further, detail regarding the implementation of block 1206 is provided in connection with FIG. 13.

At block 1208, the example grating pattern generation circuitry 1104 determines whether to measure the phase for another double-slit grating pattern 204 at a different location in the particular line of the SLM 106. If so, control advances to block 1210, where the example grating pattern generation circuitry 1104 defines the different location for the new double-slit grating pattern 204 such that the position of the first grating 206 corresponds to the position of the second grating in the previous double-slit grating pattern 204. Thereafter, control returns to block 1202 to repeat the process. If the example grating pattern generation circuitry 1104 determines, at block 1208, that no further double-slit grating patterns are to be analyzed in the particular line of the SLM 106 (e.g., the full length of the particular line has been analyzed), control advances to block 1212.

At block 1212, the example grating pattern generation circuitry 1104 determines whether to analyze another line of the SLM 106 parallel to the previous line. If so, control returns to block 1202 to repeat the process for a new line. If no additional lines parallel to the previous line(s) are to be analyzed (e.g., all lines across the surface of the SLM 106 have been analyzed), control advances to block 1214. At block 1214, the example grating pattern generation circuitry 1104 determines whether to analyze the SLM 106 along a line perpendicular to the previous line. If so, control returns to block 1202 to repeat the process for a new line perpendicular to all previous lines. In some examples, only one line perpendicular to all other lines is analyzed because only one line is needed to combine the phases defined along each of the parallel lines previously analyzed. However, in some examples, more than one line perpendicular to the full set of parallel lines may be analyzed.

Once it is determined that no more perpendicular lines are to be analyzed, control advances to block 1216 where the example phase curvature generation circuitry 1112 generates a phase curvature (e.g., the phase curvature 702 of FIG. 7) based on the phases defined for each position along each of the lines of the SLM 106 analyzed (determined at block 1206). As further detailed below in connection with FIG. 13 detailing an example implementation of block 1206, the phase for the position of the first grating 206 of the initial double-slit grating pattern 204 in each line is initialized or set to zero to serve as a reference or baseline for all other positions analyzed along the corresponding line. In some examples, to generate the full phase curvature 702 one of the parallel lines is set as a reference or baseline and the phases of all positions along all other lines are adjusted based on the phases defined for each position analyzed along the perpendicular line(s).

At block 1218, the example greyscale image generation circuitry 1106 calibrates the SLM system 100 based on the phase curvature 702. More particularly, in some examples, the algorithms used by the greyscale image generation circuitry 1106 are updated or corrected to compensate for the imperfections in the input wavefront 108 that is used by the SLM 106 to produce holographic images (e.g., the holographic image 114 of FIG. 1). As a result, holographic images 114 of much higher quality are possible. At block 1220, the example phase curvature generation circuitry 1112 determines whether to repeat the calibration process. In some examples, if there are significant variations in the phase across the SLM 106 as represented in the phase curvature 702, repeating the process may improve the accuracy of the final phase curvature 702. Thus, if the example phase curvature generation circuitry 1112 determines whether to repeat the calibration process, control returns to block 1202. Otherwise, the example program of FIG. 12 ends.

It should be noted that, the phase curvature 702 generated at block 1216 of FIG. 12 is a characterization of the input wavefront 108 incident on the SLM 106. In some examples, the phase curvature 702 is provided, via the communication interface circuitry 1102 to a user, for use independent of the SLM 106. For instance, by characterizing the input wavefront 108 through the phase curvature 702, any imperfections in the light source 102 and/or the optical elements 104 can be identified to verify properly alignment of optical elements and/or to detect misalignments. In other words, some applications of teachings disclosed herein are not limited to calibrating an SLM system, but may be used simply to characterize any wavefront of light. That is, the SLM 106 may be positioned in the path of any light beam and the above process performed to generate the phase curvature 702 that is provided to an end user for any suitable purpose (e.g., measuring and/or correcting alignment of optical elements), even if the light beam is not intended to be used by an SLM to produce holographic images 114. In such applications, block 1218 of the example process of FIG. 12 may be omitted.

As mentioned above, FIG. 13 illustrates an example process to implement block 1206 of FIG. 12. The example process of FIG. 13 begins at block 1302 where the example image sensor control circuitry 1108 causes an image sensor (e.g., the image sensor 122 of FIG. 1) to capture an interference pattern (e.g., the interference patterns 212, 214, 216 of FIG. 2) produced by the double-slit grating pattern 204 in the SLM 106. At block 1304, the example interference pattern analysis circuitry 1110 determines a phase difference between the gratings 206, 208 in the double-slit grating pattern 204 based on the interference pattern. More particularly, in some examples, the interference pattern analysis circuitry 1110 determines the phase of the apodised sine wave exhibited by the interference pattern 212, 214, 216. The phase of the interference pattern is a direct measurement of the phase difference (e.g., the phase differences 616, 618, 620 of FIG. 6) between the gratings 206, 208. At block 1306, the example interference pattern analysis circuitry 1110 determines whether the double-slit grating pattern is the initial pattern in the line of the SLM 106. If so, control advances to block 1308 where the example interference pattern analysis circuitry 1110 sets the phase for the position of first grating 206 to zero. That is, the position of the first grating 206 in the initial double-slit grating pattern in the line of the SLM 106 is defined as a reference or baseline from which the phases of all other positions in the line of the SLM 106 under analysis are defined. At block 1310, the example interference pattern analysis circuitry 1110 sets the phase for the position of the second grating 208 to the phase difference (determined at block 1304). Thereafter, the example process of FIG. 13 ends and returns to complete the process of FIG. 12.

Returning to block 1306, if the example interference pattern analysis circuitry 1110 determines that the double-slit grating pattern under analysis is not the initial pattern in the line of the SLM 106 (e.g., the program of FIG. 12 has already iterated through block 1208 at least once), control advances to block 1312. At block 1312, the example interference pattern analysis circuitry 1110 sets the phase for the position of the second grating 206 to the phase difference (determined at block 1304). Notably, after the initial double-slit grating pattern 204, there is no need to define or set the phase for the position of the first grating 206 because the position of the first grating 206 for the current double-slit grating pattern 204 under analysis corresponds to the position of the second grating 208 in the double-slit grating pattern 204 analyzed in the immediately preceding iteration of the process of FIG. 12 (based on the location of the double-slit grating pattern as defined at block 1210 of FIG. 12). Therefore, the phase for the position of the first grating 206 in the current double-slit grating pattern 204 was previously defined by the phase determined for the position of the second grating 208 in the previously analyzed double-slit grating pattern 204. Once the phase for the second grating 208 has been set, the example process of FIG. 13 ends and returns to complete the process of FIG. 12.

FIG. 14 is a flowchart representative of example machine readable instructions and/or example operations 1400 that may be executed and/or instantiated by processor circuitry to enable the SLM control circuitry 118 to generate phase response transfer curves (e.g., the phase response transfer curve 1002 of FIG. 10) to enable the example greyscale image generation circuitry 1106 to precisely select greyscale values that correspond to intended phase shifts by pixels of the SLM 106 when the voltage corresponding to such greyscale values is applied to the pixels. In some examples, the machine readable instructions and/or operations 1200 of FIG. 12 are implemented after completion of the machine readable instructions and/or operations 1400 of FIG. 12 so that any imperfections in the input wavefront 108 incident on the SLM 106 are compensated for and do not factor in the analysis.

The machine readable instructions and/or operations 1400 of FIG. 14 begin at block 1402, where the example greyscale image generation circuitry 1106 generates a greyscale image for the SLM 106 with a double-slit grating pattern (e.g., the double-slit grating pattern 204 of FIG. 2) with both gratings (e.g., the gratings 206, 208 of FIG. 2) having a low greyscale value of 0 and a high greyscale value a fixed amount above 0. In some examples, the fixed amount is 128. At block 1204, the example communications interface circuitry 1102 provides the greyscale image to the SLM 106. At block 1406, the example image sensor control circuitry 1108 causes an image sensor (e.g., the image sensor 122 of FIG. 1) to capture an interference pattern (e.g., the interference patterns 212, 214, 216 of FIG. 2) produced by the double-slit grating pattern 204 in the SLM 106. At block 1408, the example interference pattern analysis circuitry 1110 determines a phase difference between the gratings 206, 208 in the double-slit grating pattern 204 based on the interference pattern. More particular, in some examples, the interference pattern analysis circuitry 1110 determines the phase of the apodised sine wave exhibited by the interference pattern 212, 214, 216. The phase of the interference pattern is a direct measurement of the phase difference (e.g., the phase differences 616, 618, 620 of FIG. 6) between the gratings 206, 208.

At block 1410, the example phase response generation circuitry 1114 determines whether to measure the phase difference with different greyscale values. If so, control advances to block 1412 where the example grating pattern generation circuitry 1104 increments the high and low greyscale values for the first grating 206 by a fixed incremental amount. In some examples, the fixed incremental amount is 1. Thus, if the initial high and low values (used at block 1402) are 0 and 128, the values are incremented to 1 and 129. Eventually, the upper limit for valid greyscale values (e.g., 255) will be reached by the higher of the two greyscale values. In the next iteration, the higher greyscale value (e.g., at the maximum value) will drop to 1 and continue incrementing from there while the other (previously lower) greyscale value will continue to increase. Thus, at this point, the particular pixels that have higher greyscale values and the particular pixels associated with lower greyscale values will switch. At block 1414, the example grating pattern generation circuitry 1104 increases the greyscale value for a first set of pixels in the second grating 208 to match the greyscale value for a first set of pixels in the first grating 206. In this examples, the first sets of pixels in the first and second gratings 208 correspond to the pixels initially associated (e.g., at block 1402) with the high greyscale value. At block 1416, the example grating pattern generation circuitry 1104 increases the greyscale value for a second set of pixels in the second grating 208 to be higher than the greyscale value for a second set of pixels in the first grating 206 by the fixed incremental amount. In this examples, the second sets of pixels in the first and second gratings 208 correspond to the pixels initially associated (e.g., at block 1402) with the low greyscale value. Thus, to use the above example where the values for the first grating 206 increment to 1 and 129 at block 1410, the greyscale values for the second grating 208 is increased to 2 and 129 so that the first value is 1 higher than the first value for the first grating (block 1416) and the second value matches the second value in the first grating 206 (block 1414). At block 1418, the example greyscale image generation circuitry 1106 generates a new greyscale image with the double-slit grating pattern 204 at the same location in the SLM 106 (as at block 1402) based on the incremented greyscale values (defined at blocks 1412-1416). Thereafter, control returns to block 1404 to repeat the process.

Returning to block 1410, if the example phase response generation circuitry 1114 determines not to measure the phase difference with different greyscale values (e.g., because the process has iterated through all greyscale values), control advances to block 1420. At block 1420, the example phase response generation circuitry 1114 generates a phase response transfer curve (e.g., the phase response transfer curve 1002 of FIG. 10) for the location of the double-slit grating pattern based on the phase differences (determined at block 1408). Thereafter, the example memory 1116 stores the phase response transfer curve 1002. In some examples, the save response transfer curve 1002 is stored in a lookup table. AT block 1424, the example phase response generation circuitry 1114 determines whether to measure another double-slit grating pattern at a different location. If so, control returns to block 1402 to repeat the process for the new location. If not (e.g., all areas of the SLM 106 have been analyzed), control advances to block 1426 where the example phase response generation circuitry 1114 determines whether to repeat the measurements. If so, control returns to block 1402. Otherwise, the example process of FIG. 14 ends.

Figure 15:
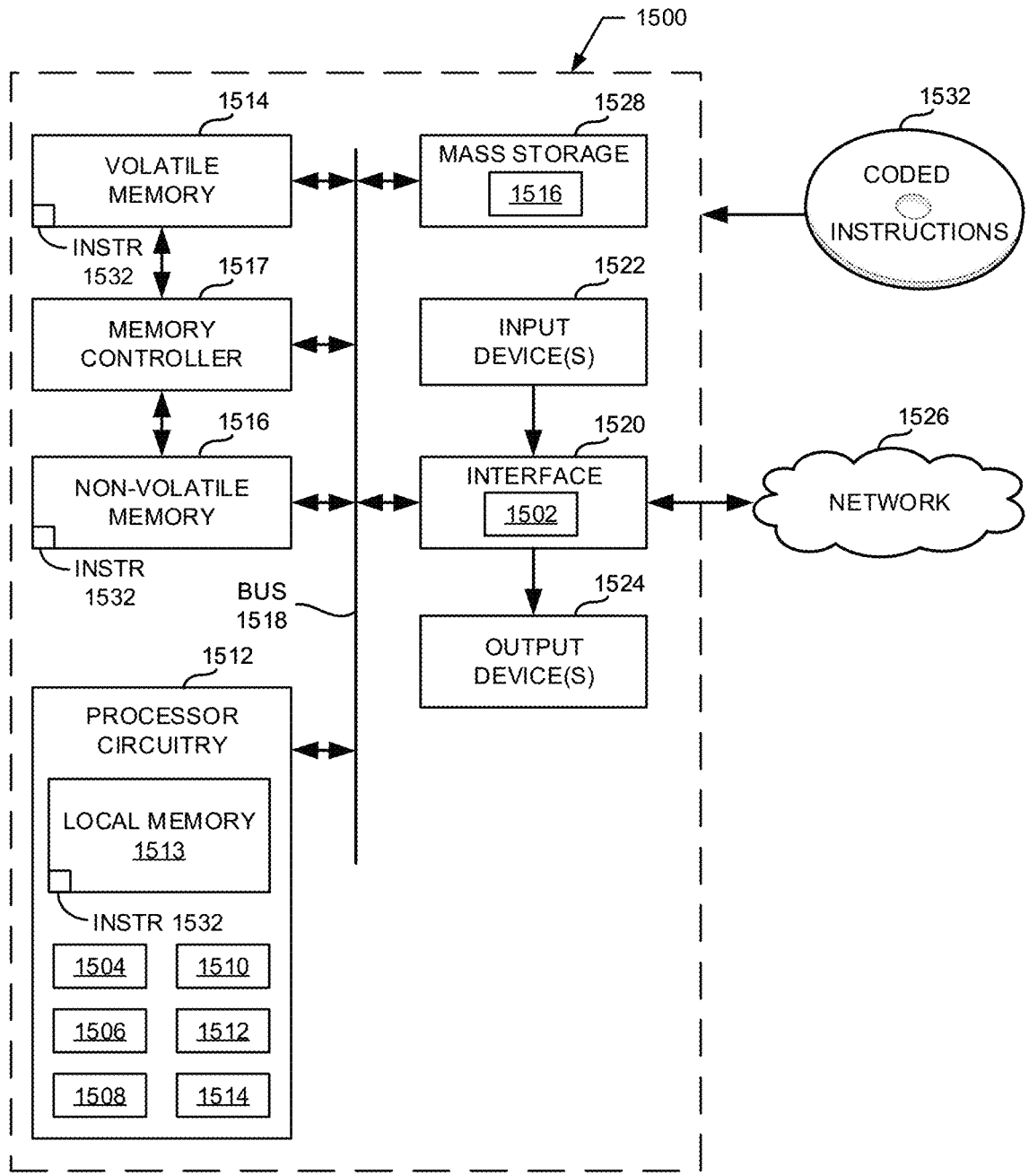
FIG. 15 is a block diagram of an example processor platform including processor circuitry structured to execute and/or instantiate the example machine readable instructions of FIGS. 12-14 to implement the example SLM control circuitry of FIGS. 1 and/or 11.

FIG. 15 is a block diagram of an example processor platform 1500 structured to execute and/or instantiate the machine readable instructions and/or operations of FIGS. 12-14 to implement the SLM control circuitry 118 of FIGS. 1 and/or 11. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a projector, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1500 of the illustrated example includes processor circuitry 1512. The processor circuitry 1512 of the illustrated example is hardware. For example, the processor circuitry 1512 can be implemented by one or more integrated circuits, logic circuits, FPGAs microprocessors, CPUs, GPUs, DSPs, and/or microcontrollers from any desired family or manufacturer. The processor circuitry 1512 may be implemented by one or more semiconductor based (e.g., silicon based) devices. In this example, the processor circuitry 1512 implements the example grating pattern generation circuitry 1104, the example greyscale image generation circuitry 1106, the example image sensor control circuitry 1108, the example interference pattern analysis circuitry 1110, the example phase curvature generation circuitry 1112, and the example phase response generation circuitry 1114.

The processor circuitry 1512 of the illustrated example includes a local memory 1513 (e.g., a cache, registers, etc.). The processor circuitry 1512 of the illustrated example is in communication with a main memory including a volatile memory 1514 and a non-volatile memory 1516 by a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1516 may be implemented by flash memory and/or any other desired type of memory device. Access to the main memory 1514, 1516 of the illustrated example is controlled by a memory controller 1517.

The processor platform 1500 of the illustrated example also includes interface circuitry 1520. The interface circuitry 1520 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In this example, the interface circuitry 1520 implements the example communications interface circuitry 1102.

In the illustrated example, one or more input devices 1522 are connected to the interface circuitry 1520. The input device(s) 1522 permit(s) a user to enter data and/or commands into the processor circuitry 1512. The input device(s) 1522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1524 are also connected to the interface circuitry 1520 of the illustrated example. The output devices 1524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1520 of the illustrated example, thus, typically includes a graphics driver card, a graphics driver chip, and/or graphics processor circuitry such as a GPU.

The interface circuitry 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1500 of the illustrated example also includes one or more mass storage devices 1528 to store software and/or data. Examples of such mass storage devices 1528 include magnetic storage devices, optical storage devices, floppy disk drives, HDDs, CDs, Blu-ray disk drives, redundant array of independent disks (RAID) systems, solid state storage devices such as flash memory devices, and DVD drives. In this example, the mass storage devices 1528 implements the example memory 1116.

The machine executable instructions 1532, which may be implemented by the machine readable instructions of FIGS. 12-14, may be stored in the mass storage device 1528, in the volatile memory 1514, in the non-volatile memory 1516, and/or on a removable non-transitory computer readable storage medium such as a CD or DVD.

Figure 16:
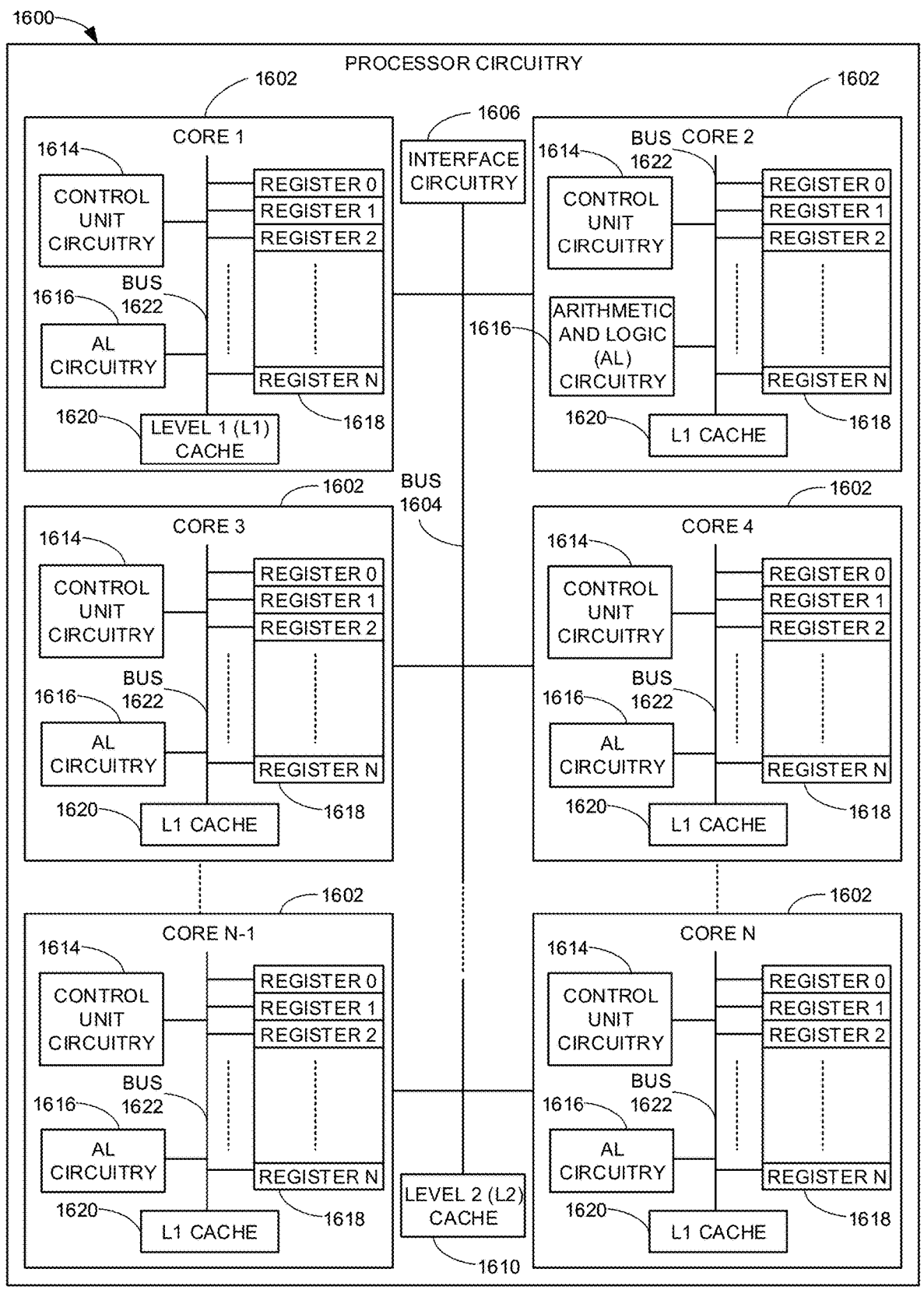
FIG. 16 is a block diagram of an example implementation of the processor circuitry of FIG. 15.

FIG. 16 is a block diagram of an example implementation of the processor circuitry 1512 of FIG. 15. In this example, the processor circuitry 1512 of FIG. 15 is implemented by a microprocessor 1600. For example, the microprocessor 1600 may implement multi-core hardware circuitry such as a CPU, a DSP, a GPU, an XPU, etc. Although it may include any number of example cores 1602 (e.g., 1 core), the microprocessor 1600 of this example is a multi-core semiconductor device including N cores. The cores 1602 of the microprocessor 1600 may operate independently or may cooperate to execute machine readable instructions. For example, machine code corresponding to a firmware program, an embedded software program, or a software program may be executed by one of the cores 1602 or may be executed by multiple ones of the cores 1602 at the same or different times. In some examples, the machine code corresponding to the firmware program, the embedded software program, or the software program is split into threads and executed in parallel by two or more of the cores 1602. The software program may correspond to a portion or all of the machine readable instructions and/or operations represented by the flowcharts of FIG. 12-14.

The cores 1602 may communicate by an example bus 1604. In some examples, the bus 1604 may implement a communication bus to effectuate communication associated with one(s) of the cores 1602. For example, the bus 1604 may implement at least one of an Inter-Integrated Circuit (I2C) bus, a Serial Peripheral Interface (SPI) bus, a PCI bus, or a PCIe bus. Additionally or alternatively, the bus 1604 may implement any other type of computing or electrical bus. The cores 1602 may obtain data, instructions, and/or signals from one or more external devices by example interface circuitry 1606. The cores 1602 may output data, instructions, and/or signals to the one or more external devices by the interface circuitry 1606. Although the cores 1602 of this example include example local memory 1620 (e.g., Level 1 (L1) cache that may be split into an L1 data cache and an L1 instruction cache), the microprocessor 1600 also includes example shared memory 1610 that may be shared by the cores (e.g., Level 2 (L2_ cache)) for high-speed access to data and/or instructions. Data and/or instructions may be transferred (e.g., shared) by writing to and/or reading from the shared memory 1610. The local memory 1620 of each of the cores 1602 and the shared memory 1610 may be part of a hierarchy of storage devices including multiple levels of cache memory and the main memory (e.g., the main memory 1514, 1516 of FIG. 15). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1602 may be referred to as a CPU, DSP, GPU, etc., or any other type of hardware circuitry. Each core 1602 includes control unit circuitry 1614, arithmetic and logic (AL) circuitry (sometimes referred to as an ALU) 1616, a plurality of registers 1618, the L1 cache 1610, and an example bus 1622. Other structures may be present. For example, each core 1602 may include vector unit circuitry, single instruction multiple data (SIMD) unit circuitry, load/store unit (LSU) circuitry, branch/jump unit circuitry, floating-point unit (FPU) circuitry, etc. The control unit circuitry 1614 includes semiconductor-based circuits structured to control (e.g., coordinate) data movement within the corresponding core 1602. The AL circuitry 1616 includes semiconductor-based circuits structured to perform one or more mathematic and/or logic operations on the data within the corresponding core 1602. The AL circuitry 1616 of some examples performs integer based operations. In other examples, the AL circuitry 1616 also performs floating point operations. In yet other examples, the AL circuitry 1616 may include first AL circuitry that performs integer based operations and second AL circuitry that performs floating point operations. In some examples, the AL circuitry 1616 may be referred to as an Arithmetic Logic Unit (ALU). The registers 1618 are semiconductor-based structures to store data and/or instructions such as results of one or more of the operations performed by the AL circuitry 1616 of the corresponding core 1602. For example, the registers 1618 may include vector register(s), SIMD register(s), general purpose register(s), flag register(s), segment register(s), machine specific register(s), instruction pointer register(s), control register(s), debug register(s), memory management register(s), machine check register(s), etc. The registers 1618 may be arranged in a bank as shown in FIG. 16. Alternatively, the registers 1618 may be organized in any other arrangement, format, or structure including distributed throughout the core 1602 to shorten access time. The bus 1622 may implement at least one of an I2C bus, a SPI bus, a PCI bus, or a PCIe bus Each core 1602 and/or, more generally, the microprocessor 1600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 17:
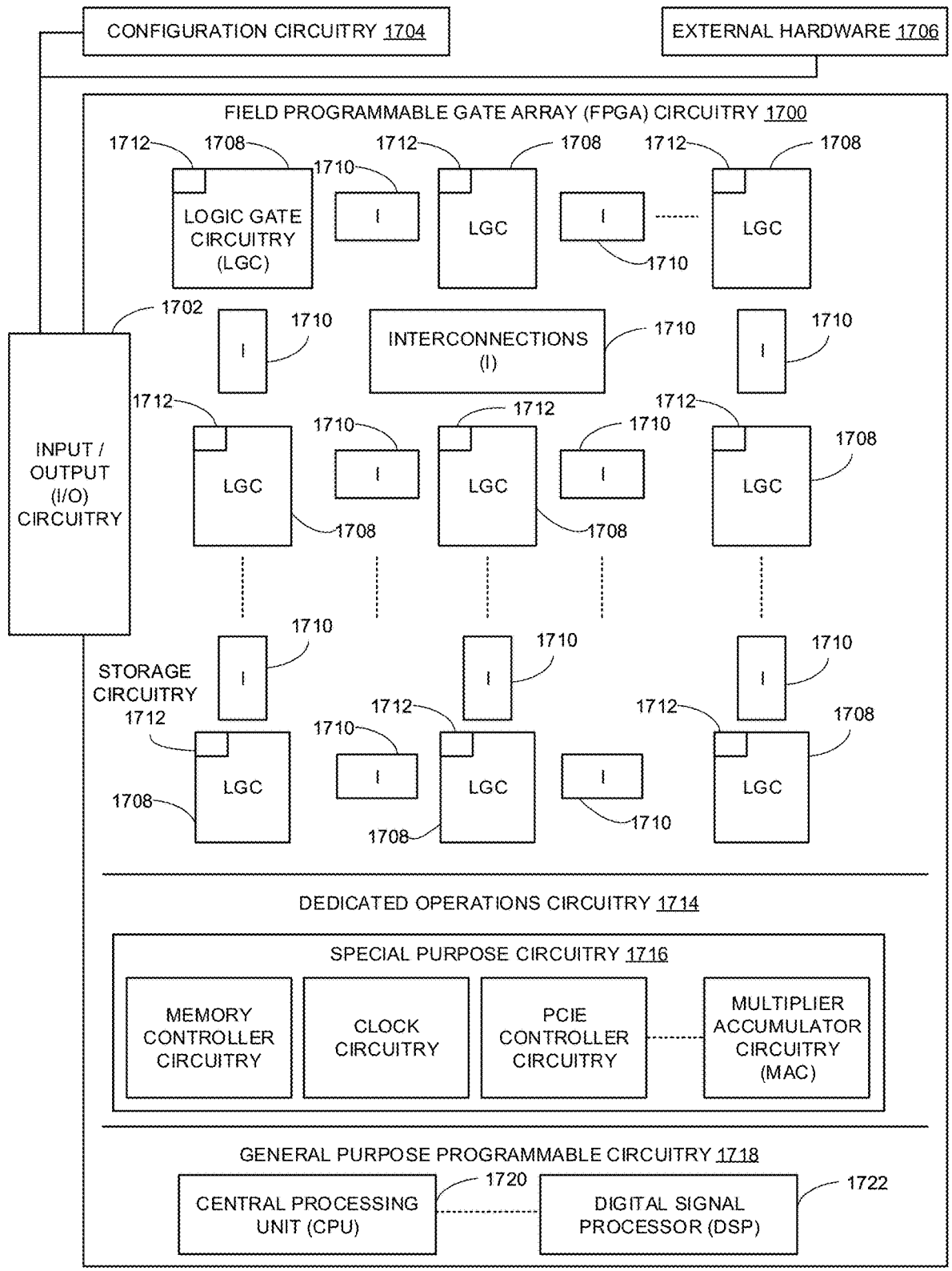
FIG. 17 is a block diagram of another example implementation of the processor circuitry of FIG. 15.

FIG. 17 is a block diagram of another example implementation of the processor circuitry 1512 of FIG. 15. In this example, the processor circuitry 1512 is implemented by FPGA circuitry 1700. The FPGA circuitry 1700 can be used, for example, to perform operations that could otherwise be performed by the example microprocessor 1600 of FIG. 16 executing corresponding machine readable instructions. However, once configured, the FPGA circuitry 1700 instantiates the machine readable instructions in hardware and, thus, can often execute the operations faster than they could be performed by a general purpose microprocessor executing the corresponding software.

More specifically, in contrast to the microprocessor 1600 of FIG. 16 described above (which is a general purpose device that may be programmed to execute some or all of the machine readable instructions represented by the flowchart of FIGS. 12-14 but whose interconnections and logic circuitry are fixed once fabricated), the FPGA circuitry 1700 of the example of FIG. 17 includes interconnections and logic circuitry that may be configured and/or interconnected in different ways after fabrication to instantiate, for example, some or all of the machine readable instructions represented by the flowcharts of FIGS. 12-14. In particular, the FPGA 1700 may be thought of as an array of logic gates, interconnections, and switches. The switches can be programmed to change how the logic gates are interconnected by the interconnections, effectively forming one or more dedicated logic circuits (unless and until the FPGA circuitry 1700 is reprogrammed). The configured logic circuits enable the logic gates to cooperate in different ways to perform different operations on data received by input circuitry. Those operations may correspond to some or all of the software represented by the flowcharts of FIGS. 12-14. As such, the FPGA circuitry 1700 may be structured to effectively instantiate some or all of the machine readable instructions of the flowcharts of FIGS. 12-14 as dedicated logic circuits to perform the operations corresponding to those software instructions in a dedicated manner analogous to an ASIC. Therefore, the FPGA circuitry 1700 may perform the operations corresponding to the some or all of the machine readable instructions of FIGS. 12-14 faster than the general purpose microprocessor can execute the same.

In the example of FIG. 17, the FPGA circuitry 1700 is structured to be programmed (and/or reprogrammed one or more times) by an end user by a hardware description language (HDL) such as Verilog. The FPGA circuitry 1700 of FIG. 17, includes example input/output (I/O) circuitry 1702 to obtain and/or output data to/from example configuration circuitry 1704 and/or external hardware (e.g., external hardware circuitry) 1706. For example, the configuration circuitry 1704 may implement interface circuitry that may obtain machine readable instructions to configure the FPGA circuitry 1700, or portion(s) thereof. In some such examples, the configuration circuitry 1704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1706 may implement the microprocessor 1600 of FIG. 16. The FPGA circuitry 1700 also includes an array of example logic gate circuitry 1708, a plurality of example configurable interconnections 1710, and example storage circuitry 1712. The logic gate circuitry 1708 and interconnections 1710 are configurable to instantiate one or more operations that may correspond to at least some of the machine readable instructions of FIGS. 12-14 and/or other desired operations. The logic gate circuitry 1708 shown in FIG. 17 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1708 to enable configuration of the electrical structures and/or the logic gates to form circuits to perform desired operations. The logic gate circuitry 1708 may include other electrical structures such as look-up tables (LUTs), registers (e.g., flip-flops or latches), multiplexers, etc.

The interconnections 1710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1708 to program desired logic circuits.

The storage circuitry 1712 of the illustrated example is structured to store result(s) of the one or more of the operations performed by corresponding logic gates. The storage circuitry 1712 may be implemented by registers or the like. In the illustrated example, the storage circuitry 1712 is distributed amongst the logic gate circuitry 1708 to facilitate access and increase execution speed.

The example FPGA circuitry 1700 of FIG. 17 also includes example Dedicated Operations Circuitry 1714. In this example, the Dedicated Operations Circuitry 1714 includes special purpose circuitry 1716 that may be invoked to implement commonly used functions to avoid the need to program those functions in the field. Examples of such special purpose circuitry 1716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1700 may also include example general purpose programmable circuitry 1718 such as an example CPU 1720 and/or an example DSP 1722. Other general purpose programmable circuitry 1718 may additionally or alternatively be present such as a GPU, an XPU, etc., that can be programmed to perform other operations.

Although FIGS. 16 and 17 illustrate two example implementations of the processor circuitry 1512 of FIG. 15, many other approaches are contemplated. For example, as mentioned above, modern FPGA circuitry may include an on-board CPU, such as one or more of the example CPU 1720 of FIG. 17. Therefore, the processor circuitry 1512 of FIG. 15 may additionally be implemented by combining the example microprocessor 1600 of FIG. 16 and the example FPGA circuitry 1700 of FIG. 17. In some such hybrid examples, a first portion of the machine readable instructions represented by the flowcharts of FIGS. 12-14 may be executed by one or more of the cores 1602 of FIG. 16 and a second portion of the machine readable instructions represented by the flowchart of FIG. 17 may be executed by the FPGA circuitry 1700 of FIG. 17.

In some examples, the processor circuitry 1512 of FIG. 15 may be in one or more packages. For example, the processor circuitry 1600 of FIG. 16 and/or the FPGA circuitry 1700 of FIG. 17 may be in one or more packages. In some examples, an XPU may be implemented by the processor circuitry 1512 of FIG. 15, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that enable the characterization of any light beam wavefront using direct measurements of differences in phase across the wavefront. Characterizing wavefronts in this matter provides many practical purposes such as measuring and/or verifying the alignment of optical elements used to generate the light beam under analysis. Further, characterizing a light beam in this manner can enable imperfections in the light beam wavefront (e.g., relative to an idealized uniform plane wave) to be detected and compensated for in an SLM that uses the light to generate holographic images. Additionally, examples disclosed herein also enable the measurement of voltage-phase response of different pixels in an SLM across all possible voltages so that the correct voltages are applied to each pixel intended to modulate an incoming light beam in a particular manner to produce a particular output image. Precisely measuring the phase response of pixels in-situ (e.g., after the SLM is manufactured and installed in a particular SLM system) enables any imperfections in the assumes SLM behavior to be corrected, thereby improving the quality (e.g., improving sharpness, contrast, and resolution, while reducing grainy noise) of resulting output images. The disclosed systems, methods, apparatus, and articles of manufacture are accordingly directed to one or more improvement(s) in the operation of a machine such as a computer or other electronic and/or mechanical device.

Example 1 includes an apparatus comprising at least one memory, instructions in the apparatus, and processor circuitry to execute and/or instantiate the instructions to provide a greyscale image to a spatial light modulator (SLM) to define voltages to be applied to individual pixels of the SLM, the voltages associated with pixel values in the greyscale image, the pixel values arranged in a double-slit grating pattern, the SLM to produce an interference pattern based on the double-slit grating pattern, determine a phase difference between first and second gratings of the double-slit grating pattern based on the interference pattern, and generate a phase curvature based on the phase difference.

Example 2 includes the apparatus of example 1, wherein variations in phase exhibited across the phase curvature are indicative of imperfections in at least one of a light source or an optical element used to produce an input beam of light incident on the SLM used to produce the interference pattern, the processor circuitry to calibrate operation of the SLM based on the phase curvature to compensate for the imperfections.

Example 3 includes the apparatus of example 1, wherein the phase curvature is indicative of a nature of a wavefront of an input beam of light incident on the SLM used to produce the interference pattern.

Example 4 includes the apparatus of example 1, wherein the greyscale image is a first greyscale image, the processor circuitry to generate a second greyscale image for the SLM using the phase curvature.

Example 5 includes the apparatus of example 1, wherein the processor circuitry is to provide a series of greyscale images to the SLM, the series of greyscale images including the greyscale image, successive ones of the greyscale images including pixel values arranged in the double-slit grating pattern, the double-slit grating pattern to be at different locations in different ones of the greyscale images, and determine different phase differences between the first and second gratings of the double-slit grating pattern at the different locations.

Example 6 includes the apparatus of example 5, wherein the different locations shift along a line of the SLM for successive ones of the greyscale images in the series of greyscale images.

Example 7 includes the apparatus of example 6, wherein an amount of shift between successive ones of the different locations corresponds to a spacing distance between the first and second gratings of the double-slit grating pattern.

Example 8 includes the apparatus of example 6, wherein the line extends in a direction perpendicular to an elongate length of the first and second gratings of the double-slit grating pattern.

Example 9 includes the apparatus of example 6, wherein the series of greyscale images is a first series of greyscale images, and the line is a first line, the processor circuitry to provide multiple additional series of greyscale images to the SLM, the multiple additional series of greyscale images including pixel values arranged in the double-slit grating pattern at additional locations along multiple additional lines parallel to and offset from the first line.

Example 10 includes the apparatus of example 9, wherein the processor circuitry is to provide a final series of greyscale images to the SLM, the final series of greyscale images including pixel values arranged in the double-slit grating pattern at final locations along a final line perpendicular to the first line and the multiple additional lines.

Example 11 includes the apparatus of example 5, wherein the processor circuitry is to define a reference phase associated with a first position of the first grating of the double-slit grating pattern at a first one of the different locations, and determine a phase, relative to the reference phase, for positions of the first and second gratings of the double-slit grating pattern at the different locations based on the different phase differences.

Example 12 includes the apparatus of example 1, wherein the greyscale image is a first greyscale image, the double-slit grating pattern is a first double-slit grating pattern associated with a first location of the SLM, and the phase difference is a first phase difference, the processor circuitry to provide a second greyscale image to the SLM, the second greyscale image including pixel values arranged in a second double-slit grating pattern, the second double-slit grating pattern associated with a second location of the SLM different than the first location, and determine a second phase difference between first and second gratings of the second double-slit grating pattern.

Example 13 includes the apparatus of example 12, wherein the first grating of the first double-slit grating pattern is at a first position and the second grating of the first double-slit grating pattern is at a second position, the second location to be offset relative to the first location such that the first grating of the second double-slit grating pattern is at the second position.

Example 14 includes the apparatus of example 13, wherein the processor circuitry is to assign a first phase value for a first phase associated with the first position, the first phase designated as a reference phase, determine a second phase value for a second phase associated with the second position, the second phase value corresponding to the first phase value plus the first phase difference, and determine a third phase value for a third phase associated with a third position corresponding to the second grating of the second double-slit grating pattern, the third phase value corresponding to the second phase value plus the second phase difference.

Example 15 includes the apparatus of example 1, wherein the processor circuitry is to obtain an image of the interference pattern from an image sensor, and determine the phase difference based on an analysis of the image.

Example 16 includes the apparatus of example 1, wherein the processor circuitry is to provide a series of greyscale images to the SLM, successive ones of the greyscale images including pixel values arranged in the double-slit grating pattern, the pixels values to alternate between low and high pixel values along a length of the first and second gratings, the low and high pixels values to be incremented by a fixed incremental amount in successive ones of the greyscale images, and determine different phase differences between the first and second gratings of the double-slit grating pattern associated with different ones of the low and high pixel values, and generate a phase response transfer curve based on the different phase differences.

Example 17 includes the apparatus of example 16, wherein the low pixels values for the second grating are higher than the low pixel values for the first grating by the fixed incremental amount.

Example 18 includes the apparatus of example 16, wherein the series of greyscale images is a first series of greyscale images, the processor circuitry to provide additional series of greyscale images to the SLM, different ones of the additional series of greyscale images corresponding to the double-slit grating pattern at different locations, and generate different phase response transfer curves for the different locations.

Example 19 includes the apparatus of example 18, wherein the processor circuitry is to generate a different greyscale image for the SLM to cause the SLM to output a holographic image, the different greyscale image including pixel values defined based on the different response transfer curves.

Example 20 includes the apparatus of example 1, wherein the SLM is a phase-only SLM.

Example 21 includes the apparatus of example 1, further including the SLM.

Example 22 includes the apparatus of example 21, further including a light source to provide the input light beam.

Example 23 includes the apparatus of example 22, further including an optical element to modify light output by the light source into the input light beam.

Example 24 includes the apparatus of example 1, further including an image sensor to capture an image of the interference pattern.

Example 25 includes the apparatus of example 1, wherein the interference pattern is a non-zero order interference pattern spaced apart from a zero order interference pattern.

Example 26 includes an apparatus comprising a spatial light modulator (SLM), greyscale image generation circuitry to generate a greyscale image, the greyscale image to define voltages to be applied to individual pixels of the SLM, the voltages defined by pixel values in the greyscale image, the pixel values arranged in a double-slit grating pattern, the SLM to produce an interference pattern based on the double-slit grating pattern, interference pattern analysis circuitry to determine a phase difference between first and second gratings of the double-slit grating pattern based on the interference pattern, and phase curvature generation circuitry to generate a phase curvature based on the phase difference.

Example 27 includes the apparatus of example 26, wherein variations in phase exhibited across the phase curvature are indicative of imperfections in at least one of a light source or an optical element used to produce an input beam of light incident on the SLM used to produce the interference pattern, the greyscale image generation circuitry to calibrate operation of the SLM based on the phase curvature to compensate for the imperfections.

Example 28 includes the apparatus of example 26, wherein the phase curvature is indicative of a nature of a wavefront of an input beam of light incident on the SLM used to produce the interference pattern.

Example 29 includes the apparatus of example 26, wherein the greyscale image is a first greyscale image, the greyscale image generation circuitry to generate a second greyscale image for the SLM using the phase curvature.

Example 30 includes the apparatus of example 26, wherein the greyscale image generation circuitry is to generate a series of greyscale images for the SLM, the series of greyscale images including the greyscale image, successive ones of the greyscale images including pixel values arranged in the double-slit grating pattern, the double-slit grating pattern to be at different locations in different ones of the greyscale images, the interference pattern analysis circuitry to determine different phase differences between the first and second gratings of the double-slit grating pattern at the different locations.

Example 31 includes the apparatus of example 30, wherein the different locations shift along a line of the SLM for successive ones of the greyscale images in the series of greyscale images.

Example 32 includes the apparatus of example 31, wherein an amount of shift between successive ones of the different locations corresponds to a spacing distance between the first and second gratings of the double-slit grating pattern.

Example 33 includes the apparatus of example 31, wherein the line extends in a direction perpendicular to an elongate length of the first and second gratings of the double-slit grating pattern.

Example 34 includes the apparatus of example 31, wherein the series of greyscale images is a first series of greyscale images, and the line is a first line, the greyscale image generation circuitry to generate multiple additional series of greyscale images for the SLM, the multiple additional series of greyscale images including pixel values arranged in the double-slit grating pattern at additional locations along multiple additional lines parallel to and offset from the first line.

Example 35 includes the apparatus of example 34, wherein the greyscale image generation circuitry is to generate a final series of greyscale images for the SLM, the final series of greyscale images including pixel values arranged in the double-slit grating pattern at final locations along a final line perpendicular to the first line and the multiple additional lines.

Example 36 includes the apparatus of example 30, wherein the interference pattern analysis circuitry is to define a reference phase associated with a first position of the first grating of the double-slit grating pattern at a first one of the different locations, and determine a phase, relative to the reference phase, for positions of the first and second gratings of the double-slit grating pattern at the different locations based on the different phase differences.

Example 37 includes the apparatus of example 26, wherein the greyscale image is a first greyscale image, the double-slit grating pattern is a first double-slit grating pattern associated with a first location of the SLM, and the phase difference is a first phase difference, the greyscale image generation circuitry to provide a second greyscale image to the SLM, the second greyscale image including pixel values arranged in a second double-slit grating pattern, the second double-slit grating pattern associated with a second location of the SLM different than the first location, the interference pattern analysis circuitry to determine a second phase difference between first and second gratings of the second double-slit grating pattern.

Example 38 includes the apparatus of example 37, wherein the first grating of the first double-slit grating pattern is at a first position and the second grating of the first double-slit grating pattern is at a second position, the second location to be offset relative to the first location such that the first grating of the second double-slit grating pattern is at the second position.

Example 39 includes the apparatus of example 38, wherein the interference pattern analysis circuitry is to assign a first phase value for a first phase associated with the first position, the first phase designated as a reference phase, determine a second phase value for a second phase associated with the second position, the second phase value corresponding to the first phase value plus the first phase difference, and determine a third phase value for a third phase associated with a third position corresponding to the second grating of the second double-slit grating pattern, the third phase value corresponding to the second phase value plus the second phase difference.

Example 40 includes the apparatus of example 26, further including image sensor control circuitry to cause an image sensor to capture an image of the interference pattern, the interference pattern analysis circuitry to determine the phase difference based on an analysis of the image.

Example 41 includes the apparatus of example 26, wherein the greyscale image generation circuitry is to generate a series of greyscale images for the SLM, successive ones of the greyscale images including pixel values arranged in the double-slit grating pattern, the pixels values to alternate between low and high pixel values along a length of the first and second gratings, the low and high pixels values to be incremented by a fixed incremental amount in successive ones of the greyscale images, the interference pattern analysis circuitry to determine different phase differences between the first and second gratings of the double-slit grating pattern associated with different ones of the low and high pixel values, the phase curvature generation circuitry to generate a phase response transfer curve based on the different phase differences.

Example 42 includes the apparatus of example 41, wherein the low pixels values for the second grating are higher than the low pixel values for the first grating by the fixed incremental amount.

Example 43 includes the apparatus of example 41, wherein the series of greyscale images is a first series of greyscale images, and the greyscale image generation circuitry to generate additional series of greyscale images for the SLM, different ones of the additional series of greyscale images corresponding to the double-slit grating pattern at different locations, the phase curvature generation circuitry to generate different phase response transfer curves for the different locations.

Example 44 includes the apparatus of example 43, wherein the greyscale image generation circuitry is to generate a different greyscale image for the SLM to cause the SLM to output a holographic image, the different greyscale image including pixel values defined based on the different response transfer curves.

Example 45 includes the apparatus of example 26, wherein the SLM is a phase-only SLM.

Example 46 includes the apparatus of example 26, further including the SLM.

Example 47 includes the apparatus of example 46, further including light source to provide the input light beam.

Example 48 includes the apparatus of example 47, further including an optical element to modify light output by the light source into the input light beam.

Example 49 includes the apparatus of example 26, further including an image sensor to capture an image of the interference pattern.

Example 50 includes the apparatus of example 26, wherein the interference pattern is a non-zero order interference pattern spaced apart from a zero order interference pattern.

Example 51 includes At least one non-transitory computer readable medium comprising instructions that, when executed, cause at least one processor to at least provide a greyscale image to a spatial light modulator (SLM) to cause application of voltages to individual pixels of the SLM, the voltages associated with pixel values in the greyscale image, the pixel values arranged in a double-slit grating pattern, the SLM to produce an interference pattern based on the double-slit grating pattern, determine a phase difference between first and second gratings of the double-slit grating pattern based on the interference pattern, and generate a phase curvature based on the phase difference.

Example 52 includes the at least one non-transitory computer readable medium of example 51, wherein variations in phase exhibited across the phase curvature are indicative of imperfections in at least one of a light source or an optical element used to produce an input beam of light incident on the SLM used to produce the interference pattern, the instructions to cause the at least one processor to calibrate operation of the SLM based on the phase curvature to compensate for the imperfections.

Example 53 includes the at least one non-transitory computer readable medium of example 51, wherein the phase curvature is indicative of a nature of a wavefront of an input beam of light incident on the SLM used to produce the interference pattern.

Example 54 includes the at least one non-transitory computer readable medium of example 51, wherein the greyscale image is a first greyscale image, and the instructions cause the at least one processor to generate a second greyscale image for the SLM using the phase curvature.

Example 55 includes the at least one non-transitory computer readable medium of example 51, wherein the instructions cause the at least one processor to provide a series of greyscale images to the SLM, the series of greyscale images including the greyscale image, successive ones of the greyscale images including pixel values arranged in the double-slit grating pattern, the double-slit grating pattern to be at different locations in different ones of the greyscale images, and determine different phase differences between the first and second gratings of the double-slit grating pattern at the different locations.

Example 56 includes the at least one non-transitory computer readable medium of example 54, wherein the different locations shift along a line of the SLM for successive ones of the greyscale images in the series of greyscale images.

Example 57 includes the at least one non-transitory computer readable medium of example 56, wherein an amount of shift between successive ones of the different locations corresponds to a spacing distance between the first and second gratings of the double-slit grating pattern.

Example 58 includes the at least one non-transitory computer readable medium of example 56, wherein the line extends in a direction perpendicular to an elongate length of the first and second gratings of the double-slit grating pattern.

Example 59 includes the at least one non-transitory computer readable medium of example 56, wherein the series of greyscale images is a first series of greyscale images, and the line is a first line, the instructions to cause the at least one processor to provide multiple additional series of greyscale images to the SLM, the multiple additional series of greyscale images including pixel values arranged in the double-slit grating pattern at additional locations along multiple additional lines parallel to and offset from the first line.

Example 60 includes the at least one non-transitory computer readable medium of example 59, wherein the instructions cause the at least one processor to provide a final series of greyscale images to the SLM, the final series of greyscale images including pixel values arranged in the double-slit grating pattern at final locations along a final line perpendicular to the first line and the multiple additional lines.

Example 61 includes the at least one non-transitory computer readable medium of example 55, wherein the instructions cause the at least one processor to define a reference phase associated with a first position of the first grating of the double-slit grating pattern at a first one of the different locations, and determine a phase, relative to the reference phase, for positions of the first and second gratings of the double-slit grating pattern at the different locations based on the different phase differences.

Example 62 includes the at least one non-transitory computer readable medium of example 51, wherein the greyscale image is a first greyscale image, the double-slit grating pattern is a first double-slit grating pattern associated with a first location of the SLM, and the phase difference is a first phase difference, the instructions to cause the at least one processor to provide a second greyscale image to the SLM, the second greyscale image including pixel values arranged in a second double-slit grating pattern, the second double-slit grating pattern associated with a second location of the SLM different than the first location, and determine a second phase difference between first and second gratings of the second double-slit grating pattern.

Example 63 includes the at least one non-transitory computer readable medium of example 62, wherein the first grating of the first double-slit grating pattern is at a first position and the second grating of the first double-slit grating pattern is at a second position, the second location to be offset relative to the first location such that the first grating of the second double-slit grating pattern is at the second position.

Example 64 includes the at least one non-transitory computer readable medium of example 63, wherein the instructions cause the at least one processor to assign a first phase value for a first phase associated with the first position, the first phase designated as a reference phase, determine a second phase value for a second phase associated with the second position, the second phase value corresponding to the first phase value plus the first phase difference, and determine a third phase value for a third phase associated with a third position corresponding to the second grating of the second double-slit grating pattern, the third phase value corresponding to the second phase value plus the second phase difference.

Example 65 includes the at least one non-transitory computer readable medium of example 51, wherein the instructions cause the at least one processor to obtain an image of the interference pattern from an image sensor, and determine the phase difference based on an analysis of the image.

Example 66 includes the at least one non-transitory computer readable medium of example 51, wherein the instructions cause the at least one processor to provide a series of greyscale images to the SLM, successive ones of the greyscale images including pixel values arranged in the double-slit grating pattern, the pixels values to alternate between low and high pixel values along a length of the first and second gratings, the low and high pixels values to be incremented by a fixed incremental amount in successive ones of the greyscale images, and determine different phase differences between the first and second gratings of the double-slit grating pattern associated with different ones of the low and high pixel values, and generate a phase response transfer curve based on the different phase differences.

Example 67 includes the at least one non-transitory computer readable medium of example 66, wherein the low pixels values for the second grating are higher than the low pixel values for the first grating by the fixed incremental amount.

Example 68 includes the at least one non-transitory computer readable medium of example 66, wherein the series of greyscale images is a first series of greyscale images, the instructions to cause the at least one processor to provide additional series of greyscale images to the SLM, different ones of the additional series of greyscale images corresponding to the double-slit grating pattern at different locations, and generate different phase response transfer curves for the different locations.

Example 69 includes the at least one non-transitory computer readable medium of example 68, wherein the instructions cause the at least one processor to generate a different greyscale image for the SLM to cause the SLM to output a holographic image, the different greyscale image including pixel values defined based on the different response transfer curves.

Example 70 includes the at least one non-transitory computer readable medium of example 51, wherein the interference pattern is a non-zero order interference pattern spaced apart from a zero order interference pattern.

Example 71 includes an apparatus comprising a spatial light modulator (SLM), an image sensor, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the interconnections to perform one or more second operations corresponding to the instructions, the storage circuitry to store a result of the one or more second operations, or Application Specific Integrate Circuitry (ASIC) including logic gate circuitry to perform one or more third operations corresponding to the instructions, the processor circuitry to perform at least one of the first operations, the second operations or the third operations to instantiate greyscale image generation circuitry to generate a greyscale image, the greyscale image to define voltages to be applied to individual pixels of the SLM, the voltages defined by pixel values in the greyscale image, the pixel values arranged in a double-slit grating pattern, the SLM to produce an interference pattern based on the double-slit grating pattern, interference pattern analysis circuitry to determine a phase difference between first and second gratings of the double-slit grating pattern based on the interference pattern obtained by the image sensor, and phase curvature generation circuitry to generate a phase curvature based on the phase difference.

Example 72 includes the apparatus of example 71, wherein variations in phase exhibited across the phase curvature are indicative of imperfections in at least one of a light source or an optical element used to produce an input beam of light incident on the SLM used to produce the interference pattern, the greyscale image generation circuitry to calibrate operation of the SLM based on the phase curvature to compensate for the imperfections.

Example 73 includes the apparatus of example 71, wherein the phase curvature is indicative of a nature of a wavefront of an input beam of light incident on the SLM used to produce the interference pattern.

Example 74 includes the apparatus of example 71, wherein the greyscale image is a first greyscale image, the greyscale image generation circuitry to generate a second greyscale image for the SLM using the phase curvature.

Example 75 includes the apparatus of example 71, wherein the greyscale image generation circuitry is to generate a series of greyscale images for the SLM, the series of greyscale images including the greyscale image, successive ones of the greyscale images including pixel values arranged in the double-slit grating pattern, the double-slit grating pattern to be at different locations in different ones of the greyscale images, the interference pattern analysis circuitry to determine different phase differences between the first and second gratings of the double-slit grating pattern at the different locations.

Example 76 includes the apparatus of example 75, wherein the different locations shift along a line of the SLM for successive ones of the greyscale images in the series of greyscale images.

Example 77 includes the apparatus of example 76, wherein an amount of shift between successive ones of the different locations corresponds to a spacing distance between the first and second gratings of the double-slit grating pattern.

Example 78 includes the apparatus of example 76, wherein the line extends in a direction perpendicular to an elongate length of the first and second gratings of the double-slit grating pattern.

Example 79 includes the apparatus of example 76, wherein the series of greyscale images is a first series of greyscale images, and the line is a first line, the greyscale image generation circuitry to generate multiple additional series of greyscale images for the SLM, the multiple additional series of greyscale images including pixel values arranged in the double-slit grating pattern at additional locations along multiple additional lines parallel to and offset from the first line.

Example 80 includes the apparatus of example 79, wherein the greyscale image generation circuitry is to generate a final series of greyscale images for the SLM, the final series of greyscale images including pixel values arranged in the double-slit grating pattern at final locations along a final line perpendicular to the first line and the multiple additional lines.

Example 81 includes the apparatus of example 75, wherein the interference pattern analysis circuitry is to define a reference phase associated with a first position of the first grating of the double-slit grating pattern at a first one of the different locations, and determine a phase, relative to the reference phase, for positions of the first and second gratings of the double-slit grating pattern at the different locations based on the different phase differences.

Example 82 includes the apparatus of example 71, wherein the greyscale image is a first greyscale image, the double-slit grating pattern is a first double-slit grating pattern associated with a first location of the SLM, and the phase difference is a first phase difference, the greyscale image generation circuitry to provide a second greyscale image to the SLM, the second greyscale image including pixel values arranged in a second double-slit grating pattern, the second double-slit grating pattern associated with a second location of the SLM different than the first location, the interference pattern analysis circuitry to determine a second phase difference between first and second gratings of the second double-slit grating pattern.

Example 83 includes the apparatus of example 82, wherein the first grating of the first double-slit grating pattern is at a first position and the second grating of the first double-slit grating pattern is at a second position, the second location to be offset relative to the first location such that the first grating of the second double-slit grating pattern is at the second position.

Example 84 includes the apparatus of example 83, wherein the interference pattern analysis circuitry is to assign a first phase value for a first phase associated with the first position, the first phase designated as a reference phase, determine a second phase value for a second phase associated with the second position, the second phase value corresponding to the first phase value plus the first phase difference, and determine a third phase value for a third phase associated with a third position corresponding to the second grating of the second double-slit grating pattern, the third phase value corresponding to the second phase value plus the second phase difference.

Example 85 includes the apparatus of example 71, wherein the processor circuitry further includes image sensor control circuitry to cause an image sensor to capture an image of the interference pattern, the interference pattern analysis circuitry to determine the phase difference based on an analysis of the image.

Example 86 includes the apparatus of example 71, wherein the greyscale image generation circuitry is to generate a series of greyscale images for the SLM, successive ones of the greyscale images including pixel values arranged in the double-slit grating pattern, the pixels values to alternate between low and high pixel values along a length of the first and second gratings, the low and high pixels values to be incremented by a fixed incremental amount in successive ones of the greyscale images, the interference pattern analysis circuitry to determine different phase differences between the first and second gratings of the double-slit grating pattern associated with different ones of the low and high pixel values, the phase curvature generation circuitry to generate a phase response transfer curve based on the different phase differences.

Example 87 includes the apparatus of example 86, wherein the low pixels values for the second grating are higher than the low pixel values for the first grating by the fixed incremental amount.

Example 88 includes the apparatus of example 86, wherein the series of greyscale images is a first series of greyscale images, and the greyscale image generation circuitry to generate additional series of greyscale images for the SLM, different ones of the additional series of greyscale images corresponding to the double-slit grating pattern at different locations, the phase curvature generation circuitry to generate different phase response transfer curves for the different locations.

Example 89 includes the apparatus of example 88, wherein the greyscale image generation circuitry is to generate a different greyscale image for the SLM to cause the SLM to output a holographic image, the different greyscale image including pixel values defined based on the different response transfer curves.

Example 90 includes the apparatus of example 71, wherein the SLM is a phase-only SLM.

Example 91 includes the apparatus of example 71, further including the SLM.

Example 92 includes the apparatus of example 91, further including light source to provide the input light beam.

Example 93 includes the apparatus of example 92, further including an optical element to modify light output by the light source into the input light beam.

Example 94 includes the apparatus of example 71, further including an image sensor to capture an image of the interference pattern.

Example 95 includes the apparatus of example 71, wherein the interference pattern is a non-zero order interference pattern spaced apart from a zero order interference pattern.

Example 96 includes an apparatus comprising means for generating a greyscale image, the greyscale image to identify voltages to be applied by a spatial light modulator (SLM) to individual pixels of the SLM, the voltages defined by pixel values in the greyscale image, the pixel values arranged in a double-slit grating pattern, the SLM to produce an interference pattern based on the double-slit grating pattern, means for determining a phase difference between first and second gratings of the double-slit grating pattern based on the interference pattern, and means for generating a phase curvature based on the phase difference.

Example 97 includes the apparatus of example 96, wherein variations in phase exhibited across the phase curvature are indicative of imperfections in at least one of a light source or an optical element used to produce an input beam of light incident on the SLM used to produce the interference pattern, the greyscale image generating means to calibrate operation of the SLM based on the phase curvature to compensate for the imperfections.

Example 98 includes the apparatus of example 96, wherein the phase curvature is indicative of a nature of a wavefront of an input beam of light incident on the SLM used to produce the interference pattern.

Example 99 includes the apparatus of example 96, wherein the greyscale image is a first greyscale image, and the greyscale image generating means is to generate a second greyscale image for the SLM using the phase curvature.

Example 100 includes the apparatus of example 96, wherein the greyscale image generating means is to generate a series of greyscale images for the SLM, the series of greyscale images including the greyscale image, successive ones of the greyscale images including pixel values arranged in the double-slit grating pattern, the double-slit grating pattern to be at different locations in different ones of the greyscale images, the phase difference determining means to determine different phase differences between the first and second gratings of the double-slit grating pattern at the different locations.

Example 101 includes the apparatus of example 100, wherein the different locations shift along a line of the SLM for successive ones of the greyscale images in the series of greyscale images.

Example 102 includes the apparatus of example 101, wherein an amount of shift between successive ones of the different locations corresponds to a spacing distance between the first and second gratings of the double-slit grating pattern.

Example 103 includes the apparatus of example 101, wherein the line extends in a direction perpendicular to an elongate length of the first and second gratings of the double-slit grating pattern.

Example 104 includes the apparatus of example 101, wherein the series of greyscale images is a first series of greyscale images, and the line is a first line, the greyscale image generating means to generate multiple additional series of greyscale images for the SLM, the multiple additional series of greyscale images including pixel values arranged in the double-slit grating pattern at additional locations along multiple additional lines parallel to and offset from the first line.

Example 105 includes the apparatus of example 104, wherein the greyscale image generating means is to generate a final series of greyscale images for the SLM, the final series of greyscale images including pixel values arranged in the double-slit grating pattern at final locations along a final line perpendicular to the first line and the multiple additional lines.

Example 106 includes the apparatus of example 100, wherein the phase difference determining means is to define a reference phase associated with a first position of the first grating of the double-slit grating pattern at a first one of the different locations, and determine a phase, relative to the reference phase, for positions of the first and second gratings of the double-slit grating pattern at the different locations based on the different phase differences.

Example 107 includes the apparatus of example 96, wherein the greyscale image is a first greyscale image, the double-slit grating pattern is a first double-slit grating pattern associated with a first location of the SLM, and the phase difference is a first phase difference, the greyscale image generating means to provide a second greyscale image to the SLM, the second greyscale image including pixel values arranged in a second double-slit grating pattern, the second double-slit grating pattern associated with a second location of the SLM different than the first location, phase difference determining means to determine a second phase difference between first and second gratings of the second double-slit grating pattern.

Example 108 includes the apparatus of example 107, wherein the first grating of the first double-slit grating pattern is at a first position and the second grating of the first double-slit grating pattern is at a second position, the second location to be offset relative to the first location such that the first grating of the second double-slit grating pattern is at the second position.

Example 109 includes the apparatus of example 108, wherein the phase difference determining means is to assign a first phase value for a first phase associated with the first position, the first phase designated as a reference phase, determine a second phase value for a second phase associated with the second position, the second phase value corresponding to the first phase value plus the first phase difference, and determine a third phase value for a third phase associated with a third position corresponding to the second grating of the second double-slit grating pattern, the third phase value corresponding to the second phase value plus the second phase difference.

Example 110 includes the apparatus of example 96, further including means for controlling an image sensor to capture an image of the interference pattern, the phase difference determining means to determine the phase difference based on an analysis of the image.

Example 111 includes the apparatus of example 96, wherein the greyscale image generating means is to generate a series of greyscale images for the SLM, successive ones of the greyscale images including pixel values arranged in the double-slit grating pattern, the pixels values to alternate between low and high pixel values along a length of the first and second gratings, the low and high pixels values to be incremented by a fixed incremental amount in successive ones of the greyscale images, the phase difference determining means to determine different phase differences between the first and second gratings of the double-slit grating pattern associated with different ones of the low and high pixel values, the phase curvature generating means to generate a phase response transfer curve based on the different phase differences.

Example 112 includes the apparatus of example 111, wherein the low pixels values for the second grating are higher than the low pixel values for the first grating by the fixed incremental amount.

Example 113 includes the apparatus of example 111, wherein the series of greyscale images is a first series of greyscale images, and the greyscale image generating means to generate additional series of greyscale images for the SLM, different ones of the additional series of greyscale images corresponding to the double-slit grating pattern at different locations, the phase curvature generating means to generate different phase response transfer curves for the different locations.

Example 114 includes the apparatus of example 115, wherein the greyscale image generating means is to generate a different greyscale image for the SLM to cause the SLM to output a holographic image, the different greyscale image including pixel values defined based on the different response transfer curves.

Example 115 includes the apparatus of example 96, wherein the SLM is a phase-only SLM.

Example 116 includes the apparatus of example 96, further including the SLM.

Example 117 includes the apparatus of example 116, further including light source to provide the input light beam.

Example 118 includes the apparatus of example 117, further including an optical element to modify light output by the light source into the input light beam.

Example 119 includes the apparatus of example 96, wherein the interference pattern is a non-zero order interference pattern spaced apart from a zero order interference pattern.

Example 120 includes a method comprising providing a greyscale image to a spatial light modulator (SLM), the greyscale image to define voltages to be applied to individual pixels of the SLM, the voltages defined by pixel values in the greyscale image, the pixel values arranged in a double-slit grating pattern, the SLM to produce an interference pattern based on the double-slit grating pattern, determining a phase difference between first and second gratings of the double-slit grating pattern based on the interference pattern, and generating a phase curvature based on the phase difference.

Example 121 includes the method of example 120, wherein variations in phase exhibited across the phase curvature are indicative of imperfections in at least one of a light source or an optical element used to produce an input beam of light incident on the SLM used to produce the interference pattern, the method further including calibrating operation of the SLM based on the phase curvature to compensate for the imperfections.

Example 122 includes the method of example 120, wherein the phase curvature is indicative of a nature of a wavefront of an input beam of light incident on the SLM used to produce the interference pattern.

Example 123 includes the method of example 120, wherein the greyscale image is a first greyscale image, the method further including generating a second greyscale image for the SLM using the phase curvature.

Example 124 includes the method of example 120, further including providing a series of greyscale images to the SLM, the series of greyscale images including the greyscale image, successive ones of the greyscale images including pixel values arranged in the double-slit grating pattern, the double-slit grating pattern to be at different locations in different ones of the greyscale images, and determining different phase differences between the first and second gratings of the double-slit grating pattern at the different locations.

Example 125 includes the method of example 124, wherein the different locations shift along a line of the SLM for successive ones of the greyscale images in the series of greyscale images.

Example 126 includes the method of example 125, wherein an amount of shift between successive ones of the different locations corresponds to a spacing distance between the first and second gratings of the double-slit grating pattern.

Example 127 includes the method of example 125, wherein the line extends in a direction perpendicular to an elongate length of the first and second gratings of the double-slit grating pattern.

Example 128 includes the method of example 125, wherein the series of greyscale images is a first series of greyscale images, and the line is a first line, the method further including providing multiple additional series of greyscale images to the SLM, the multiple additional series of greyscale images including pixel values arranged in the double-slit grating pattern at additional locations along multiple additional lines parallel to and offset from the first line.

Example 129 includes the method of example 128, further including providing a final series of greyscale images to the SLM, the final series of greyscale images including pixel values arranged in the double-slit grating pattern at final locations along a final line perpendicular to the first line and the multiple additional lines.

Example 130 includes the method of example 124, further including defining a reference phase associated with a first position of the first grating of the double-slit grating pattern at a first one of the different locations, and determining a phase, relative to the reference phase, for positions of the first and second gratings of the double-slit grating pattern at the different locations based on the different phase differences.

Example 131 includes the method of example 120, wherein the greyscale image is a first greyscale image, the double-slit grating pattern is a first double-slit grating pattern associated with a first location of the SLM, and the phase difference is a first phase difference, the method further including providing a second greyscale image to the SLM, the second greyscale image including pixel values arranged in a second double-slit grating pattern, the second double-slit grating pattern associated with a second location of the SLM different than the first location, and determining a second phase difference between first and second gratings of the second double-slit grating pattern.

Example 132 includes the method of example 131, wherein the first grating of the first double-slit grating pattern is at a first position and the second grating of the first double-slit grating pattern is at a second position, the second location to be offset relative to the first location such that the first grating of the second double-slit grating pattern is at the second position.

Example 133 includes the method of example 132, further including assigning a first phase value for a first phase associated with the first position, the first phase designated as a reference phase, determining a second phase value for a second phase associated with the second position, the second phase value corresponding to the first phase value plus the first phase difference, and determining a third phase value for a third phase associated with a third position corresponding to the second grating of the second double-slit grating pattern, the third phase value corresponding to the second phase value plus the second phase difference.

Example 134 includes the method of example 120, further including obtaining an image of the interference pattern from an image sensor, and determining the phase difference based on an analysis of the image.

Example 135 includes the method of example 120, further including providing a series of greyscale images to the SLM, successive ones of the greyscale images including pixel values arranged in the double-slit grating pattern, the pixels values to alternate between low and high pixel values along a length of the first and second gratings, the low and high pixels values to be incremented by a fixed incremental amount in successive ones of the greyscale images, and determining different phase differences between the first and second gratings of the double-slit grating pattern associated with different ones of the low and high pixel values, and generating a phase response transfer curve based on the different phase differences.

Example 136 includes the method of example 135, wherein the low pixels values for the second grating are higher than the low pixel values for the first grating by the fixed incremental amount.

Example 137 includes the method of example 135, wherein the series of greyscale images is a first series of greyscale images, the method further including providing additional series of greyscale images to the SLM, different ones of the additional series of greyscale images corresponding to the double-slit grating pattern at different locations, and generating different phase response transfer curves for the different locations.

Example 138 includes the method of example 137, further including generating a different greyscale image for the SLM to cause the SLM to output a holographic image, the different greyscale image including pixel values defined based on the different response transfer curves.

Example 139 includes the method of example 120, wherein the interference pattern is a non-zero order interference pattern spaced apart from a zero order interference pattern.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   instructions in the apparatus; and
   at least one processor circuit to execute and/or instantiate the instructions to:
   provide a greyscale image to a spatial light modulator (SLM), the greyscale image including pixel values that define voltages to be applied to individual pixels of the SLM, the pixel values arranged in a double-slit grating pattern, the SLM to produce an interference pattern based on the double-slit grating pattern;
   determine a phase difference between first and second gratings of the double-slit grating pattern based on the interference pattern; and
   generate a phase curvature based on the phase difference.

2. The apparatus of claim 1, wherein variations in phase exhibited across the phase curvature are indicative of imperfections in at least one of a light source or an optical element used to produce an input beam of light incident on the SLM used to produce the interference pattern, one or more of the at least one processor circuit to calibrate operation of the SLM based on the phase curvature to compensate for the imperfections.

3. The apparatus of claim 1, wherein the phase curvature is indicative of a nature of a wavefront of an input beam of light incident on the SLM used to produce the interference pattern.

4. The apparatus of claim 1, wherein the greyscale image is a first greyscale image, one or more of the at least one processor circuit to generate a second greyscale image for the SLM using the phase curvature.

5. The apparatus of claim 1, wherein one or more of the at least one processor circuit is to:
provide a series of greyscale images to the SLM, the series of greyscale images including the greyscale image, successive ones of the greyscale images including pixel values arranged in the double-slit grating pattern, the double-slit grating pattern to be at different locations in different ones of the greyscale images; and
determine different phase differences between the first and second gratings of the double-slit grating pattern at the different locations.

6. The apparatus of claim 5, wherein the different locations shift along a line of the SLM for successive ones of the greyscale images in the series of greyscale images.

7. The apparatus of claim 6, wherein an amount of shift between successive ones of the different locations corresponds to a spacing distance between the first and second gratings of the double-slit grating pattern.

8. The apparatus of claim 6, wherein the line extends in a direction perpendicular to an elongate length of the first and second gratings of the double-slit grating pattern.

9. The apparatus of claim 6, wherein the series of greyscale images is a first series of greyscale images, and the line is a first line, one or more of the at least one processor circuit to provide multiple additional series of greyscale images to the SLM, the multiple additional series of greyscale images including pixel values arranged in the double-slit grating pattern at additional locations along multiple additional lines parallel to and offset from the first line.

10. The apparatus of claim 9, wherein one or more of the at least one processor circuit is to provide a final series of greyscale images to the SLM, the final series of greyscale images including pixel values arranged in the double-slit grating pattern at final locations along a final line perpendicular to the first line and the multiple additional lines.

11. The apparatus of claim 5, wherein one or more of the at least one processor circuit is to:
define a reference phase associated with a first position of the first grating of the double-slit grating pattern at a first one of the different locations; and
determine a phase, relative to the reference phase, for positions of the first and second gratings of the double-slit grating pattern at the different locations based on the different phase differences.

12. The apparatus of claim 1, wherein the greyscale image is a first greyscale image, the double-slit grating pattern is a first double-slit grating pattern associated with a first location of the SLM, and the phase difference is a first phase difference, one or more of the at least one processor circuit to:
provide a second greyscale image to the SLM, the second greyscale image including pixel values arranged in a second double-slit grating pattern, the second double-slit grating pattern associated with a second location of the SLM different than the first location; and
determine a second phase difference between first and second gratings of the second double-slit grating pattern.

13. The apparatus of claim 12, wherein the first grating of the first double-slit grating pattern is at a first position and the second grating of the first double-slit grating pattern is at a second position, the second location to be offset relative to the first location such that the first grating of the second double-slit grating pattern is at the second position.

14. The apparatus of claim 13, wherein one or more of the at least one processor circuit is to:
assign a first phase value for a first phase associated with the first position, the first phase designated as a reference phase;
determine a second phase value for a second phase associated with the second position, the second phase value corresponding to the first phase value plus the first phase difference; and
determine a third phase value for a third phase associated with a third position corresponding to the second grating of the second double-slit grating pattern, the third phase value corresponding to the second phase value plus the second phase difference.

15. The apparatus of claim 1, wherein one or more of the at least one processor circuit is to:
obtain an image of the interference pattern from an image sensor; and
determine the phase difference based on an analysis of the image.

16. The apparatus of claim 1, wherein one or more of the at least one processor circuit is to:
provide a series of greyscale images to the SLM, successive ones of the greyscale images including pixel values arranged in the double-slit grating pattern, the pixels values to alternate between low and high pixel values along a length of the first and second gratings, the low and high pixels values to be incremented by a fixed incremental amount in successive ones of the greyscale images;
determine different phase differences between the first and second gratings of the double-slit grating pattern associated with different ones of the low and high pixel values; and
generate a phase response transfer curve based on the different phase differences.

17. The apparatus of claim 16, wherein the low pixels values for the second grating are higher than the low pixel values for the first grating by the fixed incremental amount.

18. The apparatus of claim 16, wherein the series of greyscale images is a first series of greyscale images, one or more of the at least one processor circuit to:
provide additional series of greyscale images to the SLM, different ones of the additional series of greyscale images corresponding to the double-slit grating pattern at different locations; and
generate different phase response transfer curves for the different locations.

19. The apparatus of claim 18, wherein one or more of the at least one processor circuit is to generate a different greyscale image for the SLM to cause the SLM to output a holographic image, the different greyscale image including pixel values defined based on the different phase response transfer curves.

20. The apparatus of claim 1, wherein the interference pattern is a non-zero order interference pattern spaced apart from a zero order interference pattern.

21. At least one non-transitory computer readable medium comprising instructions that, cause at least one processor to at least:

provide a greyscale image to a spatial light modulator (SLM), the greyscale image including pixel values that cause application of corresponding voltages to individual pixels of the SLM, the pixel values arranged in a double-slit grating pattern, the SLM to produce an interference pattern based on the double-slit grating pattern;

determine a phase difference between first and second gratings of the double-slit grating pattern based on the interference pattern; and generate a phase curvature based on the phase difference.

22. The at least one non-transitory computer readable medium of claim 21, wherein the instructions cause one or more of the at least one processor to:

provide a series of greyscale images to the SLM, the series of greyscale images including the greyscale image, successive ones of the greyscale images including pixel values arranged in the double-slit grating pattern, the double-slit grating pattern to be at different locations in different ones of the greyscale images; and determine different phase differences between the first and second gratings of the double-slit grating pattern at the different locations.

23. The at least one non-transitory computer readable medium of claim 21, wherein the greyscale image is a first greyscale image, the double-slit grating pattern is a first double-slit grating pattern associated with a first location of the SLM, and the phase difference is a first phase difference, the instructions to cause one or more of the at least one processor to:

provide a second greyscale image to the SLM, the second greyscale image including pixel values arranged in a second double-slit grating pattern, the second double-slit grating pattern associated with a second location of the SLM different than the first location; and determine a second phase difference between first and second gratings of the second double-slit grating pattern.

24. An apparatus comprising:
a spatial light modulator (SLM);
an image sensor; and
processor circuitry including one or more of:
at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
a Field Programmable Gate Array (FPGA), the FPGA including logic gate circuitry, a plurality of configurable interconnections, and storage circuitry, the logic gate circuitry and the interconnections to perform one or more second operations corresponding to the instructions, the storage circuitry to store a result of the one or more second operations; or
Application Specific Integrate Circuitry (ASIC) including logic gate circuitry to perform one or more third operations corresponding to the instructions;
the processor circuitry to perform at least one of the first operations, the second operations or the third operations to instantiate:
greyscale image generation circuitry to generate a greyscale image, the greyscale image to define voltages to be applied to individual pixels of the SLM, the voltages defined by pixel values in the greyscale image, the pixel values arranged in a double-slit grating pattern, the SLM to produce an interference pattern based on the double-slit grating pattern;
interference pattern analysis circuitry to determine a phase difference between first and second gratings of the double-slit grating pattern based on the interference pattern obtained by the image sensor; and
phase curvature generation circuitry to generate a phase curvature based on the phase difference.

25. The apparatus of claim 24, wherein the greyscale image is a first greyscale image, the greyscale image generation circuitry to generate a second greyscale image for the SLM using the phase curvature.

* * * * *